United States Patent
Matsuzaki et al.

(10) Patent No.: US 10,669,441 B2
(45) Date of Patent: Jun. 2, 2020

(54) AQUEOUS INK JET INK COMPOSITION AND INK JET RECORDING METHOD

(71) Applicant: Seiko Epson Corporation, Tokyo (JP)

(72) Inventors: Akiko Matsuzaki, Matsumoto (JP); Mitsuaki Kosaka, Minowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/904,651

(22) Filed: Feb. 26, 2018

(65) Prior Publication Data

US 2018/0282564 A1 Oct. 4, 2018

(30) Foreign Application Priority Data

Mar. 28, 2017 (JP) ................. 2017-063128

(51) Int. Cl.
| | |
|---|---|
| *C09D 11/30* | (2014.01) |
| *C09D 11/38* | (2014.01) |
| *B41M 5/00* | (2006.01) |
| *C09D 11/322* | (2014.01) |
| *C09D 11/102* | (2014.01) |
| *C09D 11/54* | (2014.01) |
| *C09D 11/40* | (2014.01) |
| *C09D 11/107* | (2014.01) |
| *C09D 11/36* | (2014.01) |

(52) U.S. Cl.
CPC ........... *C09D 11/38* (2013.01); *B41M 5/0023* (2013.01); *C09D 11/102* (2013.01); *C09D 11/107* (2013.01); *C09D 11/322* (2013.01); *C09D 11/36* (2013.01); *C09D 11/40* (2013.01); *C09D 11/54* (2013.01); *B41M 5/0011* (2013.01); *C09D 11/30* (2013.01)

(58) Field of Classification Search
CPC ........ C09D 11/38; C09D 11/40; C09D 11/107; C09D 11/102; C09D 11/54; C09D 11/322; C09D 11/36; C09D 11/30; B41M 5/0023; B41M 5/0011
See application file for complete search history.

(56) References Cited

U.S. PATENT DOCUMENTS

| | | | |
|---|---|---|---|
| 2006/0116439 A1 | 6/2006 | Sarkisian et al. | |
| 2006/0191426 A1* | 8/2006 | Timmerman | B26D 5/32 101/24 |
| 2012/0050387 A1* | 3/2012 | Nakata | C09D 11/322 347/20 |
| 2017/0022381 A1* | 1/2017 | Takamura | C09D 11/54 |

FOREIGN PATENT DOCUMENTS

| | | |
|---|---|---|
| JP | 2006-159907 A | 6/2006 |
| JP | 5862913 B1 | 2/2016 |
| JP | 2016-196551 A | 11/2016 |

* cited by examiner

*Primary Examiner* — Yaovi M Ameh
(74) *Attorney, Agent, or Firm* — Harness, Dickey & Pierce, P.L.C.

(57) ABSTRACT

An aqueous ink jet ink composition includes resin fine particles, a non-ionic surfactant, a resin dissolving solvent, and water, in which, in the aqueous ink jet ink composition, a total acid value of an acid value of the resin fine particles and an acid value of the dispersant resin when the aqueous ink jet ink composition includes a dispersant resin is 200 (mg KOH/100 g ink) or less.

33 Claims, 1 Drawing Sheet

AQUEOUS INK JET INK COMPOSITION AND INK JET RECORDING METHOD

BACKGROUND

1. Technical Field

The present invention relates to an aqueous ink jet ink composition and an ink jet recording method.

2. Related Art

An ink jet recording method for ejecting minute ink droplets from a nozzle of an ink jet head of an ink jet recording apparatus to record an image on a recording medium is known and the use thereof in the fields of sign printing and high-speed label printing has also been researched. Then, in a case where an image is recorded on a recording medium with a low ink absorbing property (for example, art paper or coated paper) or a recording medium with an ink non-absorbing property (for example, a plastic film), the use of aqueous ink jet ink compositions (also referred to below as "aqueous ink" or "ink") as ink has been researched from the viewpoint of the global environment, safety for human bodies, and the like.

In recording using an aqueous ink jet ink composition, resin fine particles (resin emulsion) in which a resin as a fixing resin is dispersed in water are used for improving the abrasion resistance of recorded matter. For the resin of the resin fine particles, a resin with an acid value is often used in order to secure the dispersion stability in the ink, and the acid value of the aqueous ink derived from the resin fine particles in the aqueous ink is high in many cases. In addition, a resin dissolving solvent may be used to dissolve resin on a recording medium to promote film formation and to improve abrasion resistance (for example, refer to JP-A-2016-196551).

There is a problem in that adhesion tends to occur in cases where recorded matter is stacked and stored. In addition, for aqueous inks which include a resin dissolving solvent that promotes film formation by dissolving a resin on a recording medium, there is a problem in that ejection stability at the time of recording is deteriorated. This is presumed to be because deposition of the resin fine particles occurs in the ink jet head when the ink is concentrated due to the aqueous ink being heated or the ink being dried in the ink jet head. In addition, in the aqueous ink which includes the resin dissolving solvent, there is difficulty in securing the dispersion stability of the resin fine particles and the pigment and there is also a problem in that the storage stability of the ink tends to be lowered. In addition, there is also a problem in that the abrasion resistance of the recorded matter was inferior.

SUMMARY

An advantage of some aspects of the invention is to provide an aqueous ink jet ink composition and an ink jet recording method which secure ejection stability at the time of recording, while also obtaining recorded matter with excellent adhesion resistance.

The invention can be realized in the following aspects or application examples.

APPLICATION EXAMPLE 1

According to an aspect of the invention, there is provided an aqueous ink jet ink composition including resin fine particles, a non-ionic surfactant, a resin dissolving solvent, and water, in which, in the aqueous ink jet ink composition, a total acid value of an acid value of the resin fine particles and an acid value of a dispersant resin when the aqueous ink jet ink composition includes a dispersant resin is 200 (mg KOH/100 g ink) or less.

According to the application example described above, the aqueous ink jet ink composition including a non-ionic surfactant makes it possible to obtain dispersion stability even in a case where the acid value is low, and the acid value being within a predetermined range makes it possible to obtain recorded matter with excellent adhesion resistance and abrasion resistance. Due to this, it is possible to provide an aqueous ink jet ink composition capable of obtaining recorded matter with excellent abrasion resistance and adhesion resistance while securing ejection stability during recording.

APPLICATION EXAMPLE 2

In the application example described above, at least one selected from the group consisting of ethers of polyalkylene oxide, esters of higher fatty acid, silicone-based compounds, acetylene glycol-based compounds, and fluorine-based compounds may be used as the non-ionic surfactant.

According to the application example described above, including a predetermined compound as a non-ionic surfactant makes it possible to obtain dispersion stability of the resin fine particles and the pigment and to obtain an aqueous ink jet ink composition capable of obtaining recorded matter with excellent abrasion resistance and adhesion resistance while securing the ejection stability during recording.

APPLICATION EXAMPLE 3

In the application example described above, an acid value of the resin fine particles in the aqueous ink jet ink composition may be 170 (mg KOH/100 g ink) or less.

According to the application example described above, setting the acid value of the resin fine particles to a predetermined range or less makes it possible to provide an aqueous ink jet ink composition capable of obtaining recorded matter with excellent abrasion resistance and adhesion resistance while securing ejection stability during recording.

APPLICATION EXAMPLE 4

In the application example described above, an acid value of the dispersant resin in the aqueous ink jet ink composition may be 100 (mg KOH/100 g ink) or less.

According to the application example described above, setting the acid value of the dispersant resin to a predetermined range or less makes it possible to provide an aqueous ink jet ink composition capable of obtaining recorded matter with excellent abrasion resistance and adhesion resistance while securing ejection stability during recording.

APPLICATION EXAMPLE 5

In the application example described above, a dispersant resin with an acid value of 300 (mg KOH/g) or less may be included as the dispersant resin.

According to the application example described above, setting the acid value of the dispersant resin to a predetermined range or less makes it possible to provide an aqueous ink jet ink composition capable of obtaining recorded matter with excellent abrasion resistance and adhesion resistance while securing ejection stability during recording.

APPLICATION EXAMPLE 6

In the application example described above, resin fine particles formed of a resin with an acid value of 60 (mg KOH/g) or less may be included as the resin fine particles.

According to the application example described above, setting the acid value of the resin fine particles to a predetermined range or less makes it possible to provide an aqueous ink jet ink composition capable of obtaining recorded matter with excellent abrasion resistance and adhesion resistance while securing ejection stability during recording.

APPLICATION EXAMPLE 7

In the application example described above, any one kind or more selected from the group consisting of a (meth) acrylic resin, a polyurethane-based resin, and a polyester-based resin may be included as the resin of the resin fine particles.

According to the application example described above, forming a resin layer on recorded matter by including a predetermined resin as the resin of the resin fine particles makes it possible to provide an aqueous ink jet ink composition capable of obtaining recorded matter with excellent abrasion resistance and adhesion resistance while securing ejection stability during recording.

APPLICATION EXAMPLE 8

In the application example described above, a content of the resin fine particles may be 2% by mass or more and 20% by mass or less.

According to the application example described above, forming a resin layer on recorded matter by setting the content of the resin fine particles in the predetermined range makes it possible to provide an aqueous ink jet ink composition capable of obtaining recorded matter with excellent abrasion resistance and adhesion resistance while securing ejection stability during recording.

APPLICATION EXAMPLE 9

In the application example described above, a content of the resin dissolving solvent may be 1% by mass or more and 18% by mass or less.

According to the application example described above, since the nozzles do not clog and the wetting permeability into the recorded matter is excellent due to the content of the resin dissolving solvent being set in the predetermined range, it is possible to provide an aqueous ink jet ink composition capable of obtaining recorded matter with excellent abrasion resistance and adhesion resistance while securing ejection stability during recording.

APPLICATION EXAMPLE 10

In the application example described above, the resin dissolving solvent may include any one kind or more selected from the group consisting of cyclic amides, alkoxyamides, cyclic esters, and esters.

According to the application example described above, since the nozzles do not clog and the wetting permeability into the recorded matter is excellent due to a predetermined compound being used as the resin dissolving solvent, the abrasion resistance, adhesion resistance, and image quality are further improved while securing ejection stability during recording.

APPLICATION EXAMPLE 11

In the application example described above, a content of an organic solvent having a standard boiling point of higher than 280° C. may be 3% by mass or less.

According to the application example described above, the content of a water-soluble organic solvent having a standard boiling point of higher than 280° C. being 3% by mass or less improves the drying property of the ink liquid on the recording medium, improves the abrasion resistance, and makes it possible to obtain recorded matter with excellent image quality.

APPLICATION EXAMPLE 12

According to another aspect of the invention, there is provided an ink jet recording method including attaching the aqueous ink jet ink composition to a recording medium by ejecting the aqueous ink jet ink composition according to any one of Application Examples 1 to 11 from an ink jet head.

According to the application example described above, the aqueous ink jet ink composition including a non-ionic surfactant and the acid value being within a predetermined range obtains dispersion stability for the pigment in a case where resin fine particles or a dispersant resin is included and makes it possible to provide an ink jet recording method capable of obtaining recorded matter with excellent abrasion resistance and adhesion resistance while securing ejection stability during recording.

APPLICATION EXAMPLE 13

In the application example described above, the attaching of the aqueous ink jet ink composition may be performed on a heated recording medium.

According to the application example described above, since the drying property of the ink composition on the recording medium is improved by performing the attaching of the aqueous ink jet ink composition on a heated recording medium, the occurrence of bleeding is suppressed and the film-forming property of the ink coating film is excellent and it is possible to form an image with excellent abrasion resistance and adhesion resistance.

APPLICATION EXAMPLE 14

In the application example described above, the ink jet recording method may further include attaching a reaction liquid to a recording medium.

According to the application example described above, the image quality is improved by attaching the reaction liquid to the recording medium.

APPLICATION EXAMPLE 15

In the application example described above, the recording medium may be a recording medium with a low absorbing property or a recording medium with a non-absorbing property.

According to the application example described above, even in a case where the recording medium is a recording medium with a low absorbing property, the film-forming property of the ink coating film becomes excellent, and it is possible to form an image with excellent abrasion resistance and adhesion resistance and to provide an ink jet recording method with excellent ejection reliability.

APPLICATION EXAMPLE 16

In the application example described above, the ink jet recording method may be performed using an ink jet recording apparatus provided with an ink jet head and a mechanism for discharging ink from the ink jet head and which is a mechanism other than a pressure generating unit for recording by ejecting an ink composition provided in the ink jet head, and control may be performed in which recording is performed for one hour or longer without performing cleaning performed by the mechanism.

According to the application example described above, it is possible to realize ink jet recording with particularly excellent ejection stability for one hour or longer without performing the cleaning.

BRIEF DESCRIPTION OF THE DRAWINGS

The invention will be described with reference to the accompanying drawings, wherein like numbers reference like elements.

DESCRIPTION OF EXEMPLARY EMBODIMENTS

A description will be given below of preferable embodiments of the invention. The embodiments described below explain one example of the invention. In addition, the invention is not limited to the following embodiments, but also includes various modified examples implemented within a scope not changing the gist of the invention.

One aspect of the aqueous ink jet ink composition according to the present embodiment is an aqueous ink jet ink composition including resin fine particles, a non-ionic surfactant, a resin dissolving solvent, and water, in which, in the aqueous ink jet ink composition, a total acid value of an acid value of the resin fine particles and an acid value of the dispersant resin in a case where the aqueous ink jet ink composition includes a dispersant resin is 200 (mg KOH/ 100 g ink) or less.

Below, regarding the aqueous ink jet ink composition and the ink jet recording method according to the present embodiment, a description will be given of various configurations of an ink jet recording apparatus which performs recording using this recording method, an aqueous ink jet ink composition (also referred to below as "ink"), a reaction liquid, and a recording medium, as well as an ink jet recording method, in this order.

1. Configurations
1.1. Ink Jet Recording Apparatus

A description will be given of an example of an ink jet recording apparatus in which the recording method according to the present embodiment is carried out with reference to the drawings. Here, the ink jet recording apparatus which is able to be used in the recording method according to the present embodiment is not limited to the following aspect.

Figure 1:
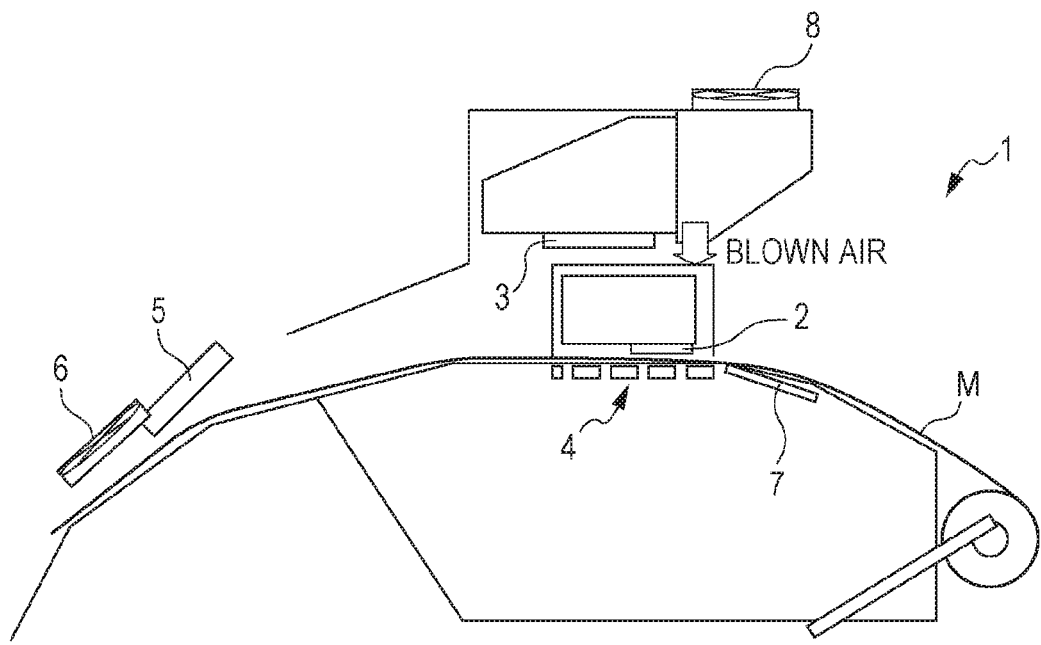
FIG. 1 is a schematic cross-sectional view schematically showing an ink jet recording apparatus.

A description will be given of an example of an ink jet recording apparatus usable in the ink jet recording apparatus used in the present embodiment with reference to the drawings. FIG. 1 is a schematic cross-sectional view schematically showing an ink jet recording apparatus. As shown in FIG. 1, the ink jet recording apparatus 1 is provided with an ink jet head 2, an IR heater 3, a platen heater 4, a curing heater 5, a cooling fan 6, a preheater 7, and a ventilation fan 8. The ink jet recording apparatus 1 is provided with a control unit (not shown), and the operation of the entire ink jet recording apparatus 1 is controlled by the control unit.

Figure 2:
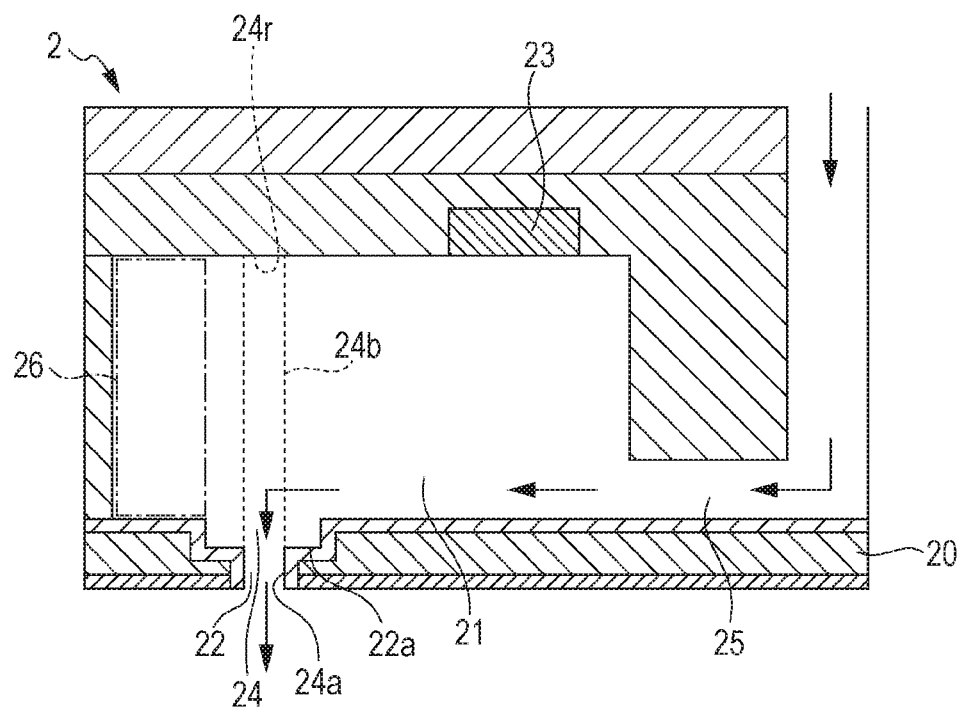
FIG. 2 is a schematic cross-sectional view schematically showing a structure of an ink jet head shown in FIG. 1.

The ink jet head 2 is a unit for ejecting and attaching the ink composition to the recording medium M and it is possible to use the type shown in FIG. 2, for example.

The ink jet head 2 is provided with a nozzle 22 which ejects the ink composition. Examples of a method of ejecting ink from a nozzle include a method (electrostatic suction method) in which a strong electric field is applied between a nozzle and an accelerating electrode placed in front of the nozzle, droplet-shaped ink is continuously ejected from the nozzle, and ink droplets are ejected corresponding to a record information signal while flying between deflection electrodes; a method in which pressure is applied to the ink by a small pump and the nozzle is mechanically vibrated by a crystal oscillator or the like to forcibly eject ink droplets; a method (piezo method) in which pressure is applied to ink by a piezoelectric element at the same time as a recording information signal and the ink droplets are ejected and recorded; a method (thermal jet method) in which ink is heated and foamed by a microelectrode according to a recording information signal and ink droplets are ejected and recorded, and the like.

As the ink jet head 2, it is possible to use any of a line type ink jet head and a serial type ink jet head.

Here, the ink jet recording apparatus provided with a serial type ink jet head means an apparatus in which scanning (passes) for ejecting the ink composition while moving the recording ink jet head relative to the recording medium is performed a plurality of times to perform recording. Specific examples of a serial type ink jet head include an ink jet head mounted on a carriage which moves in the width direction of the recording medium (direction intersecting with the transport direction of the recording medium), where the ink jet head moves as the carriage moves to eject droplets on the recording medium.

On the other hand, the ink jet recording apparatus provided with a line type ink jet head means an apparatus in which recording is performed by performing scanning (a pass) once for ejecting the ink composition while moving the recording ink jet head relative to the recording medium. Specific examples of the line type ink jet head include an ink jet head formed to be wider than the width of the recording medium where the recording head ejects droplets on the recording medium without moving the recording head.

In the present embodiment, an ink jet recording apparatus provided with a serial type ink jet head is used as the ink jet recording apparatus 1, and the ink jet head 2 using a piezo method as a method of ejecting ink from a nozzle is used.

FIG. 2 is a schematic cross-sectional view schematically showing the structure of the ink jet head 2. In FIG. 2, the arrows indicate the movement direction of the ink in the ink jet head 2. The ink jet head 2 is provided with a pressure chamber 21 and a piezoelectric element 23 which applies pressure to the pressure chamber 21 to eject the ink composition from the nozzle 22, and the piezoelectric element 23 is arranged at a position in the pressure chamber 21 other than a position 24r opposing an outflow port 24 communicating with the nozzle 22. In a case where the piezoelectric element 23 is provided directly above the nozzle 22, the extrusion force of ink from the piezoelectric element 23 is also transmitted directly to the ink film attached to the wall surface 24a, thus, it is possible to eliminate attachment of the ink film; however, it is difficult to eliminate the attachment of the ink film in a case where the piezoelectric element 23 is not provided directly above the nozzle 22, thus the ink jet recording method according to the present embodiment is useful.

FIG. 2 is a schematic cross-sectional view schematically showing the structure of the ink jet head 2. In FIG. 2, the arrows indicate the movement direction of the ink. The ink jet head 2 is provided with the pressure chamber 21 and the piezoelectric element 23 which applies pressure to the pressure chamber 21 to eject the ink composition from the nozzle 22, and the piezoelectric element 23 is arranged at a position in the pressure chamber 21 other than the position 24r opposing the outflow port 24 communicating with the nozzle 22. In a case where the piezoelectric element 23 is provided directly above the nozzle 22, the extrusion force of ink from the piezoelectric element 23 is also transmitted directly to the ink film attached to the wall surface 24a, thus, attachment of the ink film is easily eliminated; however, it is difficult to eliminate the attachment of the ink film when the ink is attached in a case where the piezoelectric element 23 is not provided directly above the nozzle 22. The aqueous ink jet ink composition according to the present embodiment is, for example, ink with which the ink film does not easily attach to the wall surface 24a or the like in a case where the piezoelectric element 23 is not provided directly above the nozzle 22 in this manner.

Here, the position 24r opposed to the outflow port 24 communicating with the nozzle 22 in the pressure chamber 21 means directly above the nozzle 22, and, in a case where it is assumed that a line (indicated by a broken line in FIG. 2) is extended from the wall surface 24a of the outflow port 24 toward the upper part of the diagram, means the region surrounded by an extension line 24b and an extension line 24b in FIG. 2. For example, for the ink jet head 2 of FIG. 2, the area of the outflow port 24 in the direction orthogonal to the direction in which the ink is ejected is a portion which is the same as the nozzle 22, not a portion widened further in. Accordingly, the piezoelectric element 23 being arranged at a position other than the position 24r means that at least a part of the piezoelectric element 23 is not positioned at least in a part of this region (the position 24r). As another example of the ink jet head in which the piezoelectric element 23 is not provided directly above the nozzle 22, there is an ink jet head provided with a piezoelectric element on a wall at either the front side or the back side of the pressure chamber 21 in FIG. 2.

The pressure chamber 21 has a retention portion 26 which retains ink in a direction extended in the ink moving direction in which the supply port 25 through which the ink is supplied to the pressure chamber 21 and the outflow port 24 of the pressure chamber 21 are connected. This retention portion 26 is a portion formed in a step of mass-producing the ink jet head 2 and it is difficult to mass-produce an ink jet head provided with the pressure chamber 21 without the retention portion 26. In this retention portion 26, the ink composition builds up easily, and ink dried matter (resin deposited matter) easily accumulates. Then, when air bubbles gather to form a space, the ink dried matter easily attaches to the wall surface of the pressure chamber 21; however, the aqueous ink jet ink composition according to the present embodiment is an ink with which ink dried matter does not easily accumulate even in a case of using the ink jet head 2 having the retention portion 26.

In addition, the ink jet head 2 may have a flow path through which ink passes from the pressure chamber 21 to the nozzle 22, that is, a step portion 22a downstream of the pressure chamber 21. This step portion 22a may be formed in the process of manufacturing the ink jet head 2. For example, the step portion 22a is a portion formed when forming the nozzle 22 by etching the silicon layer (nozzle plate 20) and it is difficult to form the nozzle plate 20 in which the step portion 22a is eliminated by etching the silicon layer. It is sufficient as long as the step portion 22a is present between the outflow port 24 of the pressure chamber 21 and the nozzle 22, and the step portion 22a is not limited to being formed in the nozzle plate 20. Bubbles may be attached and remain on the step portion 22a during the initial filling of the ink or cleaning, the bubbles float from the step portion 22a during recording and gather above the pressure chamber 21, a gas-liquid interface is generated here, the ink is dried, and ink dried matter (resin deposited matter) is produced. On the other hand, in aqueous ink jet ink composition of the present embodiment, the ink does not easily form accumulated ink dried matter even in a case of using the ink jet head 2 having such a step portion 22a. The distance from the position on the nozzle surface of the nozzle 22 to the step portion is preferably 500 µm or less, more preferably 100 µm or less. In particular, in a case where there is a step portion in the nozzle plate 20, the distance is preferably 100 µm or less.

In the present embodiment, the pressure chambers 21 of the ink jet head 2 and a plurality of ejection driving portions (not shown) and nozzles 22 provided for each of the pressure chambers 21 may be provided independently from each other in one head. Here, it is possible to form the ejection driving portion using an electromechanical conversion element such as the piezoelectric element 23 which changes the volume of the pressure chamber 21 by mechanical deformation, an electrothermal conversion element which generates bubbles in the ink by emitting heat and ejects the ink, or the like.

Returning to FIG. 1, the ink jet recording apparatus 1 is provided with the IR heater 3 and the platen heater 4 for heating the recording medium M at the time of ejecting the ink composition from the ink jet head 2. In the present embodiment, in the step of attaching the aqueous ink jet ink composition described below, it is sufficient to use at least one of the IR heater 3 and the platen heater 4 when heating the recording medium M.

Using the IR heater 3 makes it possible to heat the recording medium M from the ink jet head 2 side. Due to this, although the ink jet head 2 is also easily heated at the same time, it is possible to raise the temperature without being influenced by the thickness of the recording medium M, as compared with a case where the recording medium M is heated from the rear surface, such as with the platen heater 4. In addition, when the platen heater 4 is used when heating the recording medium M, it is possible to heat the recording medium M from the side opposite to the ink jet head 2 side. Due to this, it is relatively difficult for the ink jet head 2 to be heated. However, the surface temperature of the recording medium M due to the IR heater 3 and the platen heater 4 is preferably 25° C. or higher and 60° C. or lower, more preferably 30° C. or higher and 50° C. or lower, and even more preferably 35° C. or higher and 45° C. or lower. Due to this, the radiation heat received from the IR heater 3 and the platen heater 4 is reduced or eliminated, thus, it is possible to suppress the drying and composition variation of the ink composition in the ink jet head 2, and the ink and the resin are prevented from being deposited on the inner wall of the ink jet head 2.

The curing heater 5 is for drying and solidifying the ink composition attached on the recording medium M. The curing heater 5 heating the recording medium M, on which the image is recorded, evaporates and scatters moisture or the like included in the ink composition more quickly to form the ink film using the resin in the resin fine particles included in the ink composition. In this manner, the ink film firmly fixes (adheres) to the recording medium M such that the film-forming property is excellent and it is possible to obtain an excellent high-quality image in a short time. The drying temperature by the curing heater 5 is preferably 40° C. or higher and 120° C. or lower, more preferably 60° C. or higher and 100° C. or lower, and even more preferably 80° C. or higher and 90° C. or lower.

The ink jet recording apparatus 1 may have the cooling fan 6. After drying the ink composition recorded on the recording medium M, the ink composition on the recording medium M is cooled by the cooling fan 6, so as to be able to form the ink coating film on the recording medium M with good adhesion.

In addition, the ink jet recording apparatus 1 may be provided with the preheater 7 which heats (preheats) the recording medium M in advance before the ink composition is ejected onto the recording medium M. Furthermore, the recording apparatus 1 may be provided with the ventilation fan 8 such that the ink composition attached to the recording medium M is more efficiently dried.

1.2. Aqueous Ink Jet Ink Composition

Next, a description will be given of the aqueous ink jet ink composition according to the present embodiment. The aqueous ink jet ink composition according to the present embodiment is an aqueous ink jet ink composition including resin fine particles, a non-ionic surfactant, a resin dissolving solvent, and water, in which, in the aqueous ink jet ink composition, a total acid value of an acid value (acid number) of the resin fine particles and an acid value (acid number) of the dispersant resin in a case where the aqueous ink jet ink composition includes a dispersant resin is 200 (mg KOH/100 g ink) or less. A detailed description will be given below of components included and components able to be included in the aqueous ink jet ink composition in the present embodiment.

In the invention, the "aqueous" ink jet ink composition is a composition in which water is the main solvent and an organic solvent is not used as a main solvent. The content of the organic solvent in the composition is preferably 30% by mass or less, with respect to 100% by mass of the composition, more preferably 25% by mass or less, and particularly preferably 20% by mass or less. The content of water in the ink composition (100% by mass) is preferably 50% by mass or more, more preferably 60% by mass or more, and particularly preferably 70% by mass or more.

1.2.1. Resin Fine Particles

The aqueous ink jet ink composition according to the present embodiment includes resin fine particles in which the resin is dispersed in water (that is, in an emulsion state or a suspension state). The resin component of the resin fine particles has the function of solidifying the ink and firmly fixing the ink solid matter on the recording medium, and makes it possible to improve the abrasion resistance of the image.

The resin of the resin fine particles is not particularly limited, and examples thereof include homopolymers or copolymers of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride, fluororesins, and natural resins. Among these, the resin is preferably a (meth)acrylic resin which is a homopolymer or copolymer of at least one of (meth)acrylic monomers such as (meth)acrylic acid, (meth)acrylic acid ester, acrylonitrile, and cyanoacrylate. Among (meth)acrylic resins, copolymers of (meth)acrylic monomers and vinyl monomers are preferable. The vinyl-based monomer is not limited, but examples thereof include styrene and the like. A styrene-acrylic copolymer-based resin which is a copolymer of a (meth)acrylic monomer and styrene is particularly preferable. The copolymer described above may be in any form of a random copolymer, a block copolymer, an alternating copolymer, and a graft copolymer. In addition, polyurethane-based resins, polyester-based resins, and polyether-based resins are also preferable as the resin, and among these, as the resin of the resin fine particles, (meth)acrylic resin, polyurethane-based resin, and polyester-based resin are particularly preferable.

The aqueous ink jet ink composition according to the present embodiment including the predetermined resin described above as a resin of resin fine particles makes it possible to obtain better dispersion stability of the resin fine particles and to obtain an aqueous ink jet ink composition capable of obtaining recorded matter with excellent abrasion resistance and adhesion resistance (blocking resistance) while securing the ejection stability during recording.

The molecular weight of the resin of the resin fine particles is preferably 10,000 to 100,000, more preferably 20,000 to 80,000, and even more preferably 30,000 to 70,000. The molecular weight is able to be obtained as mass average molecular weight by measuring using polystyrene as a standard polymer using a GPC measuring apparatus.

The resin described above is not particularly limited, but is able to be obtained by, for example, the following preparation methods, and a plurality of methods may be combined as necessary. Examples of preparation methods include a method in which a polymerization catalyst (polymerization initiator) and a dispersant are mixed in a monomer which is a component forming a desired resin and polymerized (emulsion polymerization), a method in which a solution obtained by dissolving a resin having a hydrophilic part in a water-soluble organic solvent is mixed in water and then the water-soluble organic solvent is removed by distillation or the like, and a method in which a solution obtained by dissolving a resin in a water-insoluble organic solvent and a dispersant are mixed in an aqueous solution.

The average particle size of the resin described above is preferably 10 nm to 500 nm, more preferably 20 nm to 400 nm, and particularly preferably 30 nm to 300 nm. The average particle size of the resin being within the above range makes it possible to reduce clogging of the nozzle since the film-forming property is excellent and the resin does not easily form large lumps even when aggregated. Furthermore, since large lumps do not easily form, the gloss of the recorded matter is not impaired. The average particle size in the present specification is on a volume basis unless otherwise specified. As a measuring method, for example, it is possible to carry out measuring using a particle size distribution measuring apparatus using dynamic light scattering theory as a measurement principle. An example of such a particle size distribution measuring apparatus is "Microtrac UPA" manufactured by Nikkiso Co., Ltd.

As described below, the content of the resin fine particles is not particularly limited as long as the total acid value of an acid value of the resin fine particles and an acid value of the dispersant resin in a case where the aqueous ink jet ink composition includes a dispersant resin is 200 (mg KOH/ 100 g ink) or less.

In terms of solid content, the content of the resin fine particles is preferably 2% by mass or more and 20% by mass or less with respect to the total mass (100% by mass) of the ink composition, more preferably 3% by mass or more and 15% by mass or less, even more preferably 3% by mass or more and 10% by mass or less, and particularly preferably 3% by mass or more and 8% by mass or less. The solid content of the resin fine particles being in the range described above makes it possible to carry out fixing on the recording medium and to obtain an excellent film-forming property, thus it is possible to secure ejection reliability during recording and to form an image with excellent abrasion resistance and adhesion resistance.

In addition, the acid value of the resin fine particles in the aqueous ink jet ink composition is preferably 170 (mg KOH/100 g ink) or less, more preferably 160 (mg KOH/100 g ink) or less, even more preferably 150 (mg KOH/100 g ink) or less, still more preferably 100 (mg KOH/100 g ink) or less, and particularly preferably 80 (mg KOH/100 g ink) or less. In addition, the lower limit of the acid value of the resin fine particles in the aqueous ink jet ink composition is preferably 10 (mg KOH/100 g ink) or more, more preferably 20 (mg KOH/100 g ink) or more, and even more preferably 50 (mg KOH/100 g ink) or more. Setting the acid value of the resin fine particles in the predetermined range improves the dispersion stability of the resin fine particles, makes it possible to carry out fixing on the recording medium and to obtain an excellent film-forming property while securing the ejection stability during recording, and lowers the surface energy on the surface of the recorded matter, thus it is possible to obtain an aqueous ink jet ink composition capable of obtaining recorded matter with excellent abrasion resistance and adhesion resistance.

Here, the acid value of the resin fine particles described above indicates the sum of the acid values of the resin fine particles contained in the aqueous ink jet ink composition, and as the resin fine particles included in the aqueous ink jet ink composition, resin fine particles formed of a resin with an acid value of 60 (mg KOH/g) or less are preferably included, resin fine particles formed of a resin with an acid value of 45 (mg KOH/g) or less are more preferably included, resin fine particles formed of a resin with an acid value of 40 (mg KOH/g) or less are even more preferably included, resin fine particles formed of a resin with an acid value of 30 (mg KOH/g) or less are particularly preferably included, resin fine particles formed of a resin with an acid value of 25 (mg KOH/g) or less are even more preferably included, and resin fine particles formed of a resin with an acid value of 20 (mg KOH/g) or less are particularly preferably included. In addition, the resin fine particles included in the aqueous ink jet ink composition preferably include resin fine particles formed of a resin with an acid value of 5 (mg KOH/g) or more, more preferably include resin fine particles formed of a resin with an acid value of 10 (mg KOH/g) or more, and even more preferably include resin fine particles formed of a resin with an acid value of 15 (mg KOH/g) or more. Setting the acid value of the resin fine particles to a predetermined range or less makes it possible to obtain better dispersion stability for the resin fine particles and to obtain an aqueous ink jet ink composition capable of obtaining recorded matter with excellent abrasion resistance and adhesion resistance while securing ejection stability during recording. Here, it is possible to appropriately adjust the acid value of the resin fine particles by changing the ratio with the monomer species. Specifically, it is possible to carry out the adjustment by, for example, adjusting the number of ionic groups included in one molecule of the monomer having the ionic group or the mass ratio using the monomer. Examples of ionic groups include acidic groups such as carboxyl groups and sulfonic acid groups.

1.2.2. Non-Ionic Surfactant

The aqueous ink jet ink composition according to the present embodiment includes a non-ionic surfactant. The non-ionic surfactant has a dispersing action for bringing the resin fine particles into a dispersion (emulsion) state, and since the aqueous ink jet ink composition according to the present embodiment includes a non-ionic surfactant, even in a case where the ink composition includes a resin dissolving solvent, dispersion stability is obtained for the resin fine particles in the ink and the resin dispersant of the pigment described below, the storage stability of the ink is improved, the ejection reliability during recording is secured, and it is possible to form an image with excellent abrasion resistance and adhesion resistance. In particular, in a case where the ink composition includes a resin dissolving solvent and the total acid value of the acid value of the resin of the resin fine particles and the acid value of the dispersant resin is 200 (mg/KOH 100 g ink) or less, including a non-ionic surfactant gives the ink excellent storage stability, excellent ejection stability, and also a tendency to have excellent adhesion resistance.

Regarding this tendency, it is presumed that including the resin of the resin fine particles or a dispersant resin used for such an ink and having a relatively low acid value as well as a non-ionic surfactant in the ink causes the interaction between the above to contribute to the storage stability and ejection stability.

The non-ionic surfactant is preferably ethers of polyalkylene oxide, esters of higher fatty acid, a silicone-based compound, an acetylene glycol-based compound, or a fluorine-based compound. Either of ethers of polyalkylene oxide or esters of higher fatty acid are preferable in terms of being particularly excellent in ink storage stability, ejection stability, clogging recoverability, abrasion resistance, and blocking resistance. In terms of a particularly excellent image quality, any one of a silicone-based compound, an acetylene glycol-based compound, and a fluorine-based compound is preferable. In addition, in terms of particularly excellent ink storage stability, ejection stability, clogging recoverability, abrasion resistance, blocking resistance, and image quality, it is preferable to include any one of ethers of polyalkylene oxide, and esters of higher fatty acid, and any one of a silicone-based compound, an acetylene glycol-based compound, and a fluorine-based compound.

Here, higher means having 9 or more carbon atoms and preferably 9 or more and 30 or less carbon atoms. In addition, aliphatic means nonaromatic and includes chain aliphatic and cycloaliphatic. In the case of chain aliphatic, carbon-carbon double bonds may be included, but triple bonds are not included.

Ethers of polyalkylene oxide are ethers in which an aliphatic group, an aryl group, or the like is ether-bonded to the ether oxygen at the terminal of the polyalkylene oxide skeleton. The polyalkylene oxide is an oxide in which an alkylene oxide is repeatedly formed by an ether bond. Examples of polyalkylene oxides include polyethylene oxide, polypropylene oxide, combinations thereof, and the like and, in the case of a combination thereof, the order of arrangement is not limited and may be random. The number of repeating alkylene oxides n is not limited, but is preferably, for example, 5 to 50, and more preferably 10 to 40. The polyalkylene oxide skeleton is, for example, represented by the general formula below.

H—(O—R)n—O—

(Here, R represents an alkylene group. n represents an integer of 2 or more.)

The aliphatic group is preferably a higher aliphatic group. Higher and aliphatic are as defined above. Examples of aryl groups include a phenyl group, a polycyclic aryl group such as a naphthyl group and the like. The aliphatic group or the aryl group may, for example, be substituted with a functional group such as a hydroxyl group or an ester group. The aliphatic group may have a branched structure and, in particular, may have a branched structure starting from a carbon atom directly bonded to the ether oxygen at the terminal of the skeleton of the polyalkylene oxide. In addition, the ethers of the polyalkylene oxide may be a compound having a plurality of polyalkylene oxide skeletons in the molecule, and the number of polyalkylene oxide skeletons in the molecule is preferably 1 to 3.

Examples of ethers of polyalkylene oxide include polyoxyethylene alkyl ethers, polyoxyethylene alkyl phenyl ethers, polyoxyethylene alkyl glucosides, polyoxyalkylene glycol alkyl ethers, polyoxyalkylene glycol ethers, polyoxyalkylene glycol alkyl phenyl ethers, and the like.

Higher aliphatic acid esters are esters of higher aliphatic acid. Higher aliphatic is defined above and these esters may be substituted with, for example, a hydroxyl group or other functional group, and may have a branched structure. The structure of the ester portion of the higher aliphatic acid esters may be a cyclic or chain organic group and the number of carbon atoms is not limited, but is preferably 1 to 30, more preferably 2 to 20, and even more preferably 3 to 10. The higher aliphatic acid esters may be a complex type having a polyalkylene oxide skeleton.

Examples of higher aliphatic acid esters include sucrose fatty acid esters, polyoxyethylene fatty acid esters, polyoxyethylene sorbitan fatty acid esters, sorbitan fatty acid esters, polyoxyalkylene acetylene glycols, and the like.

The non-ionic surfactant preferably has a molecular weight of less than 10,000, more preferably 7,000 or less, even more preferably 5,000 or less, and yet more preferably 3,000 or less. In addition, the non-ionic surfactant preferably has a molecular weight of 100 or more. In addition, the non-ionic surfactant preferably has an HLB value of 7 or more and 18 or less. The molecular weight is able to be obtained as mass average molecular weight by measuring using polystyrene as a standard polymer using gel permeation chromatography (a GPC measuring apparatus). In addition, it is possible to use calculation to determine the molecular weight of chemicals whose chemical structural formula is able to be specified.

Examples of non-ionic surfactants include polyoxyethylene alkyl ether, polyoxyethylene alkyl phenyl ether, alkyl glucoside, polyoxyalkylene glycol alkyl ether, polyoxyalkylene glycol, polyoxyalkylene glycol alkyl phenyl ether, sucrose fatty acid ester, polyoxyethylene fatty acid ester, polyoxyethylene sorbitan fatty acid ester, sorbitan fatty acid ester polyoxyalkylene glycol alkylamine, polyoxyethylene alkylamine, polyoxyethylene alkylamine oxide, fatty acid alkanolamide, alkylol amide, polyoxyethylene polyoxypropylene block polymer, 2,4,7,9-tetramethyl-5-decyne-4,7-diol and alkylene oxide adducts of 2,4,7,9-tetramethyl-5-decyne-4,7-diol, 2,4-dimethyl-5-decyn-4-ol, alkylene oxide adducts of 2,4-dimethyl-5-decyn-4-ol, perfluoroalkyl sulfonate, perfluoroalkyl carboxylate, perfluoroalkyl phosphate esters, perfluoroalkyl ethylene oxide adducts, perfluoroalkyl betaine, perfluoroalkyl amine oxide compounds, polysiloxane-based compounds, polyether-modified organosiloxane, and the like.

Commercial products of non-ionic surfactants of ethers of polyalkylene oxide and esters of higher fatty acid having an HLB value of 7 to 18 and a molecular weight of less than 10,000 are not limited and examples thereof include ADEKATOL TN-40, TN-80, TN-100, LA-675B, LA-775, LA-875, LA-975, LA-1275, and OA-7 (the above are trade names manufactured by ADEKA Corporation), CL-40, CL-50, CL-70, CL-85, CL-95, CL-100, CL-120, CL-140, CL-160, CL-200, and CL-400 (the above are trade names manufactured by Sanyo Chemical Industries, Ltd.), Noigen XL-40, -41, -50, -60, -6190, -70, -80, -100, -140, -160, -160S, -400, -400D, -1000, Noigen TDS-30, -50, -70, -80, -100, -120, -200D, -500F, Noigen EA-137, -157, -167, -177, -197D, DKS NL-30, -40, -50, -60, -70, -80, -90, -100, -110, -180, -250, Noigen ET-89, -109, -129, -149, -159, -189, Noigen ES-99D, -129D, -149D, -169D, Sorgen TW-20, -60, -80V, -80DK, ester F-160, -140, -110, -90, and -70 (the above are trade names manufactured by DKS Co., Ltd.), Latemul PD-450, PD-420, PD-430, PD-4305, Rheodol TW-L106, TW-L120, TW-P120, TW-S106V, TW-S120V, TW-S320V, TW-0106V, TW-0120V, TW-0320V, Rheodol 430V, 440V, 460V, Rheodol Super SP-L10, TW-L120, Emanon 1112, 3199V, 4110V, 3299RV, 3299V, Emulgen 109P, 1020, 123P, 130K, 147, 150, 210P, 220, 306P, 320P, 350, 404, 408, 409PV, 420, 430, 1108, 1118S-70, 1135S-70, 1150S-60, 4085, A-60, A-90, A-500, and B-66 (the above are trade names manufactured by Kao Corporation), and the like.

The silicone-based compound is not particularly limited, but examples thereof include a polysiloxane compound, a polyether modified organosiloxane, and the like. Specific examples of commercial products of silicone-based surfactant are not particularly limited and include BYK-306, BYK-307, BYK-333, BYK-341, BYK-345, BYK-346, BYK-347, BYK-348, and BYK-349 (the above are trade names manufactured by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are trade names manufactured by manufactured by Shin-Etsu Chemical Co., Ltd.), and the like.

The acetylene glycol-based compound is not particularly limited, but, for example, one kind or more selected from 2,4,7,9-tetramethyl-5-decyne-4,7-diol and alkylene oxide adducts of 2,4,7,9-tetramethyl-5-decyne-4,7-diol, 2,4-dimethyl-5-decyn-4-ol and alkylene oxide adducts of 2,4-dimethyl-5-decyn-4-ol is preferable. Commercial products of acetylene glycol-based surfactants are not particularly limited, but examples thereof include E series such as Olfine 104 series and Olfine E1010 (trade names manufactured by Air Products and Chemicals, Inc.), Surfynol 465, Surfynol 61, and Surfynol DF110D (trade names manufactured by Nissin Chemical Co., Ltd.), and the like. The acetylene glycol-based surfactant may be used alone or in a combination of two kinds or more thereof.

The fluorine-based compound is not particularly limited, but examples thereof include perfluoroalkyl sulfonate, perfluoroalkyl carboxylate, perfluoroalkyl phosphate esters, perfluoroalkyl ethylene oxide adducts, perfluoroalkyl betaine, and perfluoroalkyl amine oxide compounds. Examples of commercial products of fluorine-based surfactants are not particularly limited, but examples thereof include Surflon 5144 and 5145 (the above are trade names manufactured by AGC Seimi Chemical Co., Ltd.); FC-170C, FC-430, and Fluorad-FC 4430 (the above are trade names manufactured by Sumitomo 3M Ltd.); FSO, FSO-100, FSN, FSN-100, and FS-300 (the above are trade names manufactured by Dupont); and FT-250 and 251 (the above are trade names manufactured by Neos Co., Ltd.). The fluorine-based surfactant may be used alone or in a combination of two kinds or more thereof.

Among these, it is possible for the acetylene glycol-based surfactant to further improve the nozzle clogging recoverability. On the other hand, the fluorine-based surfactant and the silicone-based surfactant are preferable in terms of having a function of uniformly spreading ink so as not to cause shading unevenness or bleeding of the ink on the recording medium.

The content of the non-ionic surfactant is preferably 0.1% by mass or more and 10% by mass or less with respect to the total mass (100% by mass) of the ink composition, more preferably 0.25% by mass or more and 5% by mass or less, and even more preferably 0.5% by mass or more and 2% by mass or less. The content of the non-ionic surfactant being within the above range further improves the ejection reliability, the abrasion resistance, and the adhesion resistance.

1.2.3. Resin Dissolving Solvent

The aqueous ink jet ink composition according to the present embodiment includes a resin dissolving solvent. Including a resin dissolving solvent in the aqueous ink jet ink composition according to the present embodiment dissolves the resin of the recording medium on the recording medium to promote film formation and makes it possible to form an image with excellent adhesion resistance. In addition, it is possible to form an image having excellent abrasion resistance. Here, regarding the adhesion resistance, in a case where a recording medium is placed in a state of contact with the recording surface of the recorded matter for a long period of time, the ink coating film on the recording surface adheres to the recording medium and peeling occurs and this peeling is presumed to occur in a case where the film formation is insufficient due to dissolution of the resin of the ink. In addition, it is presumed that the recording surface is easily adhered due to the influence of heat, atmospheric moisture, or the like during the period in which the recording surface is in contact with the recording medium, and it is presumed that this influence differs depending on the acid value of the ink and the components of the surfactant.

The resin dissolving solvent has a property of dissolving the resin and, specifically means that, when 1 gram of the resin of the resin fine particles contained in the aqueous ink jet ink composition of the embodiment is added to 100 grams of the solvent and stirred for one hour at 80° C., the resin dissolves and the resin does not appear to be lumps or particles when visually observed.

The resin dissolving solvent preferably also has compatibility with water included in the ink. Specifically, solvents having a solubility at 25° C. of 0.5% by mass or more, which is parts by mass of solvent to be dissolved with respect to 100 parts by mass of water, are preferable.

More specifically, examples of alcohols include 2-methyl-1-butanol, 3-methyl-1-butanol, 1-hexanol, 2-methyl-1-pentanol, 4-methyl-2-pentanol, 2-(benzyloxy) ethanol, and the like.

Examples of ethers include propylene oxide, furan, and the like.

Examples of ketones include 2-hexanone, 2-methyl-4-pentanone, mesityl oxide isophorone, and the like.

Examples of esters include n-propyl formate, n-butyl formate, isobutyl formate, n-propyl acetate, n-butyl acetate, isobutyl acetate, sec-butyl acetate, sec-hexyl acetate, ethyl propionate, butyl propionate, methyl butyrate, butyl butyrate, isobutyl isobutyrate, 2-butoxyethyl acetate, and the like.

Examples of nitrogen-containing compounds include 1-nitropropane, 2-nitropropane, and the like.

Examples of sulfur-containing compounds include dimethyl sulfide, diethyl sulfide, thiophene, and the like.

The cyclic esters include, for example, compounds represented by Formula (1).

(In Formula (1), $R^1$ represents hydrogen or an alkyl group having 1 to 4 carbon atoms, and d represents an integer of 0 to 3. The alkyl group may be linear or branched.)

Examples of the compound represented by Formula (1) include cyclic esters (lactones) such as β-propiolactone, γ-butyrolactone, δ-valerolactone, ε-caprolactone, β-butyrolactone, and γ-valerolactone, and compounds in which the hydrogen of the methylene group adjacent to the carbonyl group thereof is substituted with an alkyl group having 1 to 4 carbon atoms, and the like.

Examples of alkoxyalkylamides include a compound represented by Formula (2).

$$R^2O—CH_2CH_2—CO—NR^3R^4 \quad (2)$$

(In Formula (2), $R^2$ represents an alkyl group having 1 to 4 carbon atoms, and $R^3$ and $R^4$ each independently represents an alkyl group having 1 to 2 carbon atoms)

The compound represented by Formula (2) is a β-alkoxypropionamide compound and examples thereof include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Furthermore, heterocyclic compounds, cyclic amides, nitrogen-containing cyclic compounds, and the like may be included.

Examples of cyclic amides include compounds represented by Formula (3).

(In Formula (3), $R^5$ represents hydrogen or an alkyl group having 1 to 4 carbon atoms, and e represents an integer of 0 to 3. The alkyl group may be linear or branched.)

Examples of the compound represented by Formula (3) include 2-pyrrolidone, 1-methyl-2-pyrrolidone, 1-ethyl-2-pyrrolidone, and the like.

These resin dissolving solvents described above may be used alone or in a mixture of two kinds or more. Among the resin dissolving solvents described above, it is preferable to use any one kind or more selected from the group consisting of cyclic amides, alkoxyamides, cyclic esters, and esters. In this case, the abrasion resistance, adhesion resistance, and image quality are further improved.

The content of the resin dissolving solvent is preferably 1% by mass or more and 18% by mass or less with respect to the total mass (100% by mass) of the aqueous ink jet ink composition, more preferably 2% by mass or more and 16% by mass or less, even more preferably 3% by mass or more and 14% by mass or less, and particularly preferably 4% by mass or more and 12% by mass or less. The content of the resin dissolving solvent being in the range described above makes it possible to obtain better dispersion stability for the resin fine particles and to obtain recorded matter with excellent abrasion resistance and adhesion resistance while securing ejection stability during recording.

1.2.4. Dispersant Resin

The aqueous ink jet ink composition according to the present embodiment may include a dispersant resin (Polymeric dispersant). The dispersant resin is a resin having a function of dispersing other components included in the ink composition. Examples of other components include components existing in a dispersed state in the ink composition, such as pigments and resins.

The dispersant resin is preferably a resin having a hydrophilic moiety and a hydrophobic moiety and examples thereof include amphiphilic resins. Examples of the hydrophilic moiety include hydrophilic functional groups and hydrophilic structures such as polyether structures, and examples of the hydrophobic moiety include hydrophobic functional groups and hydrophobic structures such as alkylene structures. The dispersant resin is preferably an amphiphilic resin, but resins as a whole include examples such as water-soluble resins, semi-water-soluble resins, and water-insoluble resins.

Examples of dispersant resins include polyvinyl alcohols, polyvinyl pyrrolidones, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acryl acid copolymers, and the like and salts thereof. Among these, in particular, a copolymer of a monomer having a hydrophobic functional group and a monomer having a hydrophilic functional group, and a polymer formed of a monomer having both a hydrophobic functional group and a hydrophilic functional group are preferable. As the form of the copolymer, it is possible to use any of a random copolymer, a block copolymer, an alternating copolymer, and a graft copolymer.

Examples of salts include salts of basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, and morpholine. The addition amount of these basic compounds is not particularly limited as long as the addition amount is the neutralization equivalent or more of the dispersant resin.

The molecular weight of the dispersant resin is preferably in the range of 1,000 to 100,000 as the weight average molecular weight, more preferably in the range of 3,000 to 10,000, and even more preferably in the range of 4,000 to 8,000. By the molecular weight being within the above range, for example, a stable dispersion of coloring materials such as pigments in water is obtained and it is easy to carry out viscosity control and the like at the time of application to the ink composition. It is possible to carry out the molecular weight measurement by the method described above.

It is also possible to use a commercial product as the dispersant resin described above. Specific examples thereof include Joncryl 67 (weight average molecular weight: 12,500, acid value: 213), Joncryl 678 (weight average molecular weight: 8,500, acid value: 215), Joncryl 586 (weight average molecular weight: 4,600, acid value: 108), Joncryl 611 (weight average molecular weight: 8,100, acid value: 53), Joncryl 680 (weight average molecular weight: 4,900, acid value: 215), Joncryl 682 (weight average molecular weight: 1,700, acid value: 238), Joncryl 683 (weight average molecular weight: 8,000, acid value: 160), and Joncryl 690 (weight average molecular weight: 16,500, acid value: 240) (the above are all trade names manufactured by BASF Japan Ltd.), and the like.

Here, the content of the dispersant resin is not particularly limited as long as, as described for the resin fine particles above, the dispersant resin is included such that the total acid value of the acid value of the resin fine particles and the acid value of the dispersant resin is 200 (mg KOH/100 g ink) or less; however, the acid value of the dispersant resin in the ink composition is preferably 100 (mg KOH/100 g ink) or less, more preferably 80 (mg KOH/100 g ink) or less, and even more preferably 70 (mg KOH/100 g ink) or less. In addition, the lower limit of the acid value of the dispersant resin in the ink composition is preferably 0 (mg KOH/100 g ink) or more, more preferably 20 (mg KOH/100 g ink) or less, and even more preferably 30 (mg KOH/100 g ink) or less. Setting the acid value of the dispersant resin in the predetermined range makes it possible to obtain better dispersion stability for the resin fine particles, and to obtain an aqueous ink jet ink composition able to obtain recorded matter with excellent abrasion resistance and adhesion resistance while securing ejection stability during recording.

In addition, it is preferable to include a dispersant resin with an acid value of 300 (mg KOH/g) or less, more preferably a dispersant resin with an acid value of 250 (mg KOH/g) or less, and even more preferably a dispersant resin with an acid value of 200 (mg KOH/g) or less. In addition, it is preferable to include a dispersant resin with an acid value lower limit of 50 (mg KOH/g) or more, more preferably a dispersant resin with an acid value of 80 (mg KOH/g) or more, even more preferably a dispersant resin with an acid value of 100 (mg KOH/g) or more, and particularly preferably a dispersant resin with an acid value of 150 (mg KOH/g) or more. Setting the acid value of the dispersant resin in the predetermined ranges improves the dispersion stability of the resin fine particles and makes it possible to obtain an aqueous ink jet ink composition capable of obtaining recorded matter with excellent abrasion resistance and adhesion resistance while securing the ejection stability during recording. Here, it is possible to appropriately adjust the acid value of the dispersant resin by changing the ratio with the monomer species. Specifically, it is possible to carry out the adjustment by, for example, adjusting the number of ionic groups included in one molecule of the monomer having the ionic group or the mass ratio using the monomer. Examples of ionic groups include acidic groups such as carboxyl groups and sulfonic acid groups.

1.2.5. Water

The aqueous ink jet ink composition according to the present embodiment contains water. Water is the main medium of the aqueous ink jet ink composition and is a component that evaporates and scatters by heating. It is preferable that the water be obtained by removing ionic impurities or the like as much as possible like pure water or ultrapure water such as ion-exchanged water, ultra-filtered water, reverse osmosis water, and distilled water. In addition, the use of water sterilized by ultraviolet ray irradiation or addition of hydrogen peroxide or the like is suitable since it is possible to suppress the generation of fungi and bacteria when the pigment dispersion liquid and the ink composition using the same are stored for a long time.

The water content is preferably 40% by mass or more with respect to the total mass (100% by mass) of the aqueous ink jet ink composition, more preferably 50% by mass or more, even more preferably 55% by mass or more, and particularly preferably 60% by mass or more.

1.2.6. Coloring Material

The aqueous ink jet ink composition according to the present embodiment may contain a coloring material. Examples of coloring materials include dyes, pigments, and the like, and it is preferable to use a pigment because the pigment has a property of being resistant to discoloration by light, gas, and the like. Therefore, recorded matter formed on a recording medium with an ink non-absorbing property or a low absorbing property using a pigment is excellent not only in image quality but also in water resistance, gas resistance, light resistance, and the like, and the storability is good.

The pigment usable in the present embodiment is not particularly limited, but examples thereof include inorganic pigments and organic pigments. As the inorganic pigment, in addition to titanium oxide and iron oxide, it is possible to use carbon black produced by a known method such as a contact method, a furnace method, a thermal method, and the like. On the other hand, as the organic pigment, it is possible to use azo pigments (including azo lake, insoluble azo pigments, condensed azo pigments, chelate azo pigments, and the like), polycyclic pigments (for example, phthalocyanine pigments, perylene pigments, perinone pigments, anthraquinone pigments, quinophthalone pigments, and the like), nitro pigments, nitroso pigments, aniline black, and the like.

Specific examples of the pigments usable in the present embodiment include carbon black as the black pigment, the carbon black is not particularly limited, and examples thereof include furnace black, lamp black, acetylene black, channel black or the like (C.I. Pigment Black 7), as commercial products, No. 2300, 900, MCF88, No. 20B, No. 33, No. 40, No. 45, No. 52, MA7, MA8, MA77, MA100, No. 2200B, and the like (the above are all trade names manufactured by Mitsubishi Chemical Corporation), Color Black FW1, FW2, FW2V, FW18, FW200, S150, S160, S170, PRETEX 35, U, V, 140U, Special Black 6, 5, 4A, 4, 250, and the like (the above are all trade names manufactured by Evonik Japan Co., Ltd.), Conductex SC, Raven 1255, 5750, 5250, 5000, 3500, 1255, 700, and the like (the above are all trade names manufactured by Columbia Carbon Co., Ltd.), Regal 400R, 330R, 660R, Mogul L, Monarch 700, 800, 880, 900, 1000, 1100, 1300, 1400, Elf Tech 12, and the like (the above are trade names manufactured by Cabot Japan Corporation).

The white pigment is not particularly limited and examples thereof include C.I. Pigment White 6, 18, and 21, and white inorganic pigments of titanium oxide, zinc oxide, zinc sulfide, antimony oxide, magnesium oxide, and zirconium oxide. In addition to the white inorganic pigment, it is also possible to use white organic pigments such as white hollow resin fine particles and polymer particles.

The pigment used for the yellow ink is not particularly limited, but examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used for the magenta ink is not particularly limited, but examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 or C.I. Pigment Violet 19, 23, 32, 33, 36, 38, 43, and 50.

The pigment used for the cyan ink is not particularly limited, but examples thereof include C.I. Pigment Blue 1, 2, 3, 15, 15:1, 15:2, 15:3, 15:34, 15:4, 16, 18, 22, 25, 60, 65, 66; C.I. Vat Blue 4, and 60.

In addition, pigments used for color inks other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63, and C.I. Pigment White 6, 18, and 21.

The pearl pigment is not particularly limited, but examples thereof include pigments having pearly luster and interference gloss such as titanium dioxide-coated mica, fish scale foil, and bismuth oxychloride.

Examples of metallic pigments are not particularly limited, but examples thereof include particles formed of a single substance such as aluminum, silver, gold, platinum, nickel, chromium, tin, zinc, indium, titanium, and copper, or an alloy.

The content of the coloring material included in the ink composition is preferably 0.5% by mass or more and 10% by mass or less with respect to the total mass (100% by mass) of the aqueous ink jet ink composition, more preferably 1% by mass or more and 7.0% by mass or less, even more preferably 1% by mass or more and 6.5% by mass or less, and yet more preferably 2% by mass or more and 6% by mass or less. Setting the content of the coloring material in the range described above makes it possible to secure ejection reliability during recording and to form an image with excellent color development, abrasion resistance, and adhesion resistance.

In order to apply the pigment described above to the aqueous ink jet ink composition, it is necessary to stably disperse and hold the pigment in water. Examples of the method include a method of dispersing with a dispersant resin such as a water-soluble resin and/or a water-dispersible resin (the pigment dispersed by this method is referred to below as a "resin-dispersed pigment"), a method of dispersing with a surfactant of a water-soluble surfactant and/or a water-dispersible surfactant (a pigment dispersed by this method is referred to below as a "surfactant-dispersed pigment"), a method in which a hydrophilic functional group is chemically and physically introduced to the surface of the pigment particle so as to be able to be dispersed and/or dissolved in water without a dispersant such as the resin or the surfactant described above (a pigment dispersed by this method is referred to below as a "surface-treated pigment"), and the like. In the present embodiment, it is possible to use any of the resin-dispersed pigment, the surfactant-dispersed pigment, and the surface-treated pigment as the ink composition, and it is also possible to use a mixture of a plurality of kinds as necessary. As the dispersant resin used for the resin-dispersed pigment, for example, it is possible to use the dispersant resin described above.

Examples of the surfactant used for the surfactant dispersed pigment include anionic surfactants such as alkane sulfonate, α-olefin sulfonate, alkyl benzene sulfonate, alkyl naphthalene sulfonate, acyl methyl taurate, dialkyl sulfosuccinate, alkyl sulfuric acid ester salts, sulfated olefins, polyoxyethylene alkyl ether sulfuric acid ester salts, alkyl phosphoric acid ester salts, polyoxyethylene alkyl ether phosphoric acid ester salts, and monoglyceride phosphoric acid ester salts, amphoteric surfactants such as alkyl pyridium salt, alkyl amino acid salt, and alkyl dimethyl betaine, and non-ionic surfactants such as a polyoxyethylene alkyl ether, a polyoxyethylene alkyl phenyl ether, a polyoxyethylene alkyl ester, a polyoxyethylene alkyl amide, glycerol alkyl esters, and sorbitan alkyl esters.

The addition amount of the dispersant resin or the surfactant to the pigment is preferably 1 part by mass to 100 parts by mass with respect to 100 parts by mass of the pigment, and more preferably 5 parts by mass to 50 parts by mass. Within this range, it is possible to secure dispersion stability of the pigment in water.

In addition, examples of surface-treated pigments include a hydrophilic functional group such as —OM, —COOM, —CO—, —SO$_3$M, —SO$_2$NH$_3$, —RSO$_3$M, —PO$_3$HM, —PO$_3$M$_3$, —SO$_3$NHCOR, —NH$_3$, and —NR$_3$ (in the formula, M represents a hydrogen atom, an alkali metal, ammonium, or organic ammonium, and R represents an alkyl group having 1 to 12 carbon atoms, a phenyl group which may have a substituent, or a naphthyl group which may have a substituent). These functional groups are physically and/or chemically introduced by being grafted on the pigment particle surface directly and/or via other groups. Examples of polyvalent groups include an alkylene group having 1 to 12 carbon atoms, a phenylene group which may have a substituent, a naphthylene group which may have a substituent, and the like.

In addition, as the surface-treated pigment, a pigment is preferable which is surface treated such that —SO$_3$M and/or —RSO$_3$M (M is a counter ion and is a hydrogen ion, alkali metal ion, ammonium ion, or organic ammonium ion) is chemically bonded to the pigment particle surface using a treating agent including sulfur, that is, a pigment is preferable which is dispersed in a solvent which does not have active protons, which has no reactivity with sulfonic acid, and in which the pigment is insoluble or poorly soluble, and which is then subjected to a surface treatment such that —SO$_3$M and/or —RSO$_3$M is chemically bonded to the particle surface with amidosulfuric acid or a complex of sulfur trioxide and a tertiary amine such that the pigment is dispersed and/or dissolvable in water.

As the surface treatment unit for grafting the functional group or a salt thereof on the surface of the pigment particle directly or via a polyvalent group, it is possible to apply various known surface treatment units. Examples of the units include a unit for applying ozone or a sodium hypochlorite solution to commercially available oxidized carbon black and subjecting the carbon black to a further oxidization treatment to further hydrophilize the surface thereof (for example, JP-A-7-258578, JP-A-8-3498, JP-A-10-120958, JP-A-10-195331, and JP-A-10-237349), a unit for treating carbon black with 3-amino-N-alkyl substituted pyridium bromide (for example, JP-A-10-195360 and JP-A-10-330665), a unit for dispersing an organic pigment in a solvent in which the organic pigment is insoluble or hardly soluble, and introducing a sulfone group onto the surface of the pigment particle using a sulfonating agent (for example, JP-A-8-283596, JP-A-10-110110, and JP-A-10-110111), a unit for dispersing an organic pigment in a basic solvent which forms a complex with sulfur trioxide, treating the surface of an organic pigment by adding sulfur trioxide, and introducing a sulfone group or a sulfonamino group (for example, JP-A-10-110114), and the like; however, the unit for preparing the surface-treated pigment used in the invention is not limited to these units.

The number of functional groups grafted to one pigment particle may be one or a plurality of kinds. The kind and degree of the functional group to be grafted may be appropriately determined in consideration of the dispersion stability in the ink, the color density, the drying property on the front face of the ink jet head, and the like.

It is possible to carry out a method of dispersing the resin dispersed pigment, the surfactant dispersed pigment, and the surface treated pigment in water by adding each of a pigment, water, and a dispersant resin as the resin dispersed pigment; a pigment, water, and a surfactant as the surfactant dispersed pigment; a surface-treated pigment and water as the surface-treated pigment; and a water-soluble organic solvent/neutralizing agent and the like as necessary into a dispersing machine used in the related art such as a ball mill, sand mill, attritor, roll mill, agitator mill, Henschel mixer, a colloid mill, an ultrasonic homogenizer, a jet mill, an Ang-mill, or the like. In such a case, from the viewpoint of securing the dispersion stability of the pigment in water, regarding the particle size of the pigment, dispersion is carried out until the average particle size is preferably 20 nm or more and 500 nm or less, and more preferably 50 nm or more and 200 nm or less.

1.2.7. Organic Solvent

The aqueous ink jet ink composition according to the present embodiment may contain an organic solvent other than the resin dissolving solvent described above. The ink composition containing an organic solvent makes the drying property of the aqueous ink jet ink composition ejected on the recording medium good and makes it possible to obtain an image with excellent abrasion resistance.

The organic solvent used for the ink composition is preferably a water-soluble organic solvent. Using the water-soluble organic solvent makes the drying property of the ink composition good and makes it possible to obtain an image with excellent abrasion resistance.

Examples of organic solvents are not particularly limited, but examples thereof include alcohols such as methanol, ethanol, and isopropyl alcohol; ketones or ketoalcohols such as acetone and diacetone alcohol; ethers such as tetrahydrofuran and dioxane; glycols such as hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether, and diethylene glycol monobutyl ether; amines having a hydroxyl group such as diethanolamine and triethanolamine; and glycerin. Among these, propylene glycol, 1,2-hexanediol, 1,3-butanediol, and the like are preferably used from the viewpoint of improving the drying property of the aqueous ink jet ink composition.

The content of the organic solvent is preferably 0.5% by mass or more and 45% by mass or less with respect to the total mass (100% by mass) of the aqueous ink jet ink composition, more preferably 1.0% by mass or more and 40% by mass or less, particularly preferably 2.0% by mass or more and 35% by mass or less, and even more particularly preferably 2.0% by mass or more and 25% by mass or less. The standard boiling point of the organic solvent is preferably 180° C. or higher, more preferably 180° C. to 300° C., even more preferably 200° C. to 270° C., and particularly preferably 210° C. to 250° C. In a case where the standard boiling point of the organic solvent is within the above range, the ejection reliability and abrasion resistance of the ink composition are superior, which is preferable.

Here, an organic solvent having a boiling point of 280° C. or higher may absorb moisture of the ink to increase the viscosity of the ink near the ink jet head, which may lower the ejection stability of the ink jet head. In addition, the drying property of the ink is significantly lowered. Therefore, in the present embodiment, the content of the organic solvent having a standard boiling point of 280° C. or higher in the aqueous ink jet ink composition is preferably 5% by mass or less, more preferably 3% by mass or less, even more preferably 2% by mass or less, still more preferably 1% by mass or less, and yet more preferably 0.5% by mass or less. In this case, the drying property of the ink composition on the recording medium becomes high in various recording media, particularly in recording media with an ink non-absorbing property or a low ink absorbing property, thus the occurrence of bleeding is suppressed and it is possible to form an image with an excellent image quality by suppressing shading unevenness in the image. In addition, the image is excellent in abrasion resistance.

Examples of an organic solvent having a boiling point of 280° C. or higher include glycerin. Glycerin has high hygroscopicity and a high boiling point, which may cause clogging of the ink jet head and malfunctioning of the ink jet head. In addition, since glycerin is poor in antiseptic properties and easily causes fungi and bacteria to propagate, glycerin is preferably not contained in the ink composition.

1.2.8. Surfactants Other than Non-Ionic Surfactants

The aqueous ink composition forming the ink set according to the present embodiment may contain a surfactant in addition to the non-ionic surfactant described above. The surfactant may be a surfactant which is added for a purpose such as a surface adjusting agent at the time of preparing the ink or may be a surfactant used for emulsification and dispersion of components included in the ink. Although not particularly limited, examples thereof include ionic surfactants such as cationic surfactants, anionic surfactants, and amphoteric surfactants.

1.2.9. Other Components

In the present embodiment, in order to maintain good storage stability and ejection stability from the head, to improve clogging, or to prevent deterioration of the ink, it is also possible to appropriately add various kinds of additives to the aqueous ink jet ink composition such as an antifoaming agent, a dissolution aid, a viscosity adjusting agent, a pH adjusting agent, an antioxidant, a preservative, a mildewproofing agent, a corrosion inhibitor, a moisturizing agent which is not an organic solvent, and a chelating agent for capturing metal ions which influence the dispersion.

Examples of pH adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate, and the like.

Examples of preservatives/fungicides include sodium benzoate, sodium pentachlorophenol, sodium 2-pyridinethiol-1-oxide, sodium sorbate, sodium dehydroacetate, 1,2-dibenzisothiazolin-3-one, and the like. Examples of commercial products include Proxel XL 2, Proxel GXL (the above are trade names manufactured by Avecia), Denicide CSA, NS-500 W (the above are trade names, manufactured by Nagase ChemteX Corporation), and the like.

Examples of rust inhibitors include benzotriazole and the like.

Examples of chelating agents include ethylenediaminetetraacetic acid and salts thereof (disodium ethylenediaminetetraacetate disodium salt, and the like) and the like.

Examples of a moisturizing agent which is not an organic solvent include moisturizing agents which are solid at room temperature, such as trimethylolpropane and sugar.

1.2.10. Method for Preparing Aqueous Ink Jet Ink Composition

In the present embodiment, the aqueous ink jet ink composition is obtained by mixing the components described above in any order and, as necessary, removing impurities by filtration or the like. As a method of mixing the respective components, a method is suitably used in which materials are sequentially added to a container provided with a stirrer such as a mechanical stirrer, a magnetic stirrer and the like, and stirred and mixed. As a filtration method, it is possible to carry out centrifugal filtration, filter filtration and the like as necessary.

1.2.11. Physical Properties of Aqueous Ink Jet Ink Composition

In the aqueous ink jet ink composition of the present embodiment, from the viewpoint of balance between image quality and reliability as ink for ink jet recording, the surface tension at 20° C. is preferably 18 mN/m or more and 40 mN/m, more preferably 20 mN/m or more and 35 mN/m or less, and even more preferably 22 mN/m or more and 33 mN/m or less. For the measurement of the surface tension, for example, it is possible to carry out measurement by confirming the surface tension when a platinum plate is wetted with ink in an environment of 20° C. using an automatic surface tensiometer CBVP-Z (trade name, manufactured by Kyowa Interface Science Co., Ltd.).

From the same viewpoint, the viscosity of the aqueous ink jet ink composition according to the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Physica) under an environment of 20° C.

In addition, in the aqueous ink jet ink composition according to the present embodiment, the total acid value of an acid value of the resin fine particles and an acid value of the dispersant resin in a case where the aqueous ink jet ink composition includes a dispersant resin is 200 (mg KOH/100 g ink) or less. In the present embodiment, the aqueous ink jet ink composition including a non-ionic surfactant and the acid value being in a predetermined range or less makes it possible to obtain dispersion stability of the resin fine particles and the pigment, and to obtain an aqueous ink jet ink composition capable of obtaining recorded matter with excellent abrasion resistance and adhesion resistance while securing the ejection stability during recording.

Here, in the present embodiment, the acid value in the ink composition represents the total value of the oxidation derived from the resin included in 100 g of the ink composition, and in the present embodiment, the acid value is the total acid value of the acid value of the resin fine particles included in 100 g of the ink composition and the acid value of the dispersant resin included in 100 g of the ink composition in a case where the aqueous ink jet ink composition includes a dispersant resin. It is possible to determine the acid value of the resin fine particles in the ink composition, for example, as follows.

When the acid value of the resin of the resin fine particles 1 is A1 (mg KOH/g) and the mass of the resin fine particle 1 included in 100 g of the ink composition is B1 (g), the acid value of the resin fine particles in 100 g of the ink composition is represented by the oxidation amount $C = A1 \times B1$. In a case where resin fine particles other than the above resin fine particles 1 (resin fine particles 2, 3 . . . ) are also included as the resin fine particles, the oxidation amount C of the resin fine particles in 100 g of the ink composition is $C = A1 \times B1 + A2 \times B2 + A3 \times B3 + \ldots$.

It is also possible to determine the acid value of the dispersant resin in the same manner as the acid value of the resin fine particles in 100 g of the above ink composition. When the acid value of the dispersant resin 1 is D1 (mg KOH/g) and the mass of the dispersant resin 1 included in 100 g of the ink composition is E1 (g), the acid value of the dispersant resin in 100 g of the ink composition is represented by the oxidation amount $F = D1 \times E1$. In a case where a plurality of types (dispersant resins 2, 3 . . . ) are also included as dispersion resins, the oxidation amount F of the dispersant resin in 100 g of the ink composition is $F = D1 \times E1 + D2 \times E2 + D3 \times E3 + \ldots$.

The total of the acid value of the resin fine particles in 100 g of the ink composition thus obtained and the acid value of the dispersant resin in 100 g of the ink composition is the total acid value in 100 g of the ink composition.

It is possible to measure the acid value of the resin using a potentiometric titration method. For example, it is possible to carry out a method based on "JIS K 0070 test method of chemical product acid value, saponification value, ester value, iodine value, hydroxyl group value, and unsaponifiable matter", and the like. An example of such a potentiometric titration apparatus is the potentiometric automatic titration apparatus AT 610 (manufactured by Kyoto Electronics Manufacturing Co., Ltd.).

The aqueous ink jet ink composition according to the present embodiment preferably has a total acid value of 180 (mg KOH/100 g ink) or less, more preferably 150 (mg KOH/100 g ink) or less, and even more preferably 130 (mg KOH/100 g ink) or less. In addition, the lower limit of the total acid value of the aqueous ink jet ink composition is preferably 30 (mg KOH/100 g ink) or more, more preferably 50 (mg KOH/100 g ink) or more, even more preferably 70 (mg KOH/100 g ink) or more, still more preferably 90 (mg KOH/100 g ink) or more, and particularly preferably 100 (mg KOH/100 g ink) or more. The total acid value being within the above range makes it possible to obtain better dispersion stability for the pigment in a case where resin fine particles and a dispersant resin are included and to obtain an aqueous ink jet ink composition able to obtain recorded matter with excellent abrasion resistance and adhesion resistance while securing the ejection stability during recording. Here, it is possible to set the total acid value described above by adjusting the type of the resin fine particles and the dispersant resin to be contained in the ink composition and the content thereof in the ink composition.

In an aqueous ink jet ink composition including a resin dissolving solvent, when the ink is heated in the ink jet head or concentrated by drying of the ink, the resin fine particles are deposited on each other, thus, the ejection stability during recording is lowered and there is a tendency to be easily adhered in a case where the obtained recorded matter is stored in an overlapping manner. On the other hand, in the aqueous ink jet ink composition according to the present embodiment, including the non-ionic surfactant described above and setting the acid value of the resin of the resin fine particles to a predetermined range makes it possible to secure the ejection stability and to obtain an ink with excellent abrasion resistance and adhesion resistance even in an aqueous ink jet ink composition including a resin dissolving solvent. This is presumed to be because the non-ionic surfactant adsorbs to the hydrophobic portion of the resin fine particles having a low acid value, whereby the dispersion stability of the resin fine particles is excellent and the deposition of the resin fine particles on each other does not easily occur even in the ink jet head, and furthermore there is also an effect of preventing adhesion of the ink coating film on the surface of the recorded matter. In addition, it is also considered that, due to the interaction between the resin fine particles having a predetermined acid value or less and the non-ionic surfactant, deposition between the resin fine particles does not easily occur.

The same applies to a case where the aqueous ink jet ink composition includes a dispersant resin, and when the ink is heated in the ink jet head or concentrated by drying the ink, the polymer dispersant is deposited on the resin particles, thus the ejection stability during recording is lowered and there is a tendency to be easily adhered in a case where the obtained recorded matter is stored in an overlapping manner. On the other hand, in the aqueous ink jet ink composition according to the present embodiment, including the non-ionic surfactant described above and setting the total acid value of the resin fine particles and the dispersant resin within a predetermined range makes it possible to improve both points, that is, to improve the overall ejection stability of the ink and to obtain an aqueous ink jet ink composition able to obtain recorded matter with excellent abrasion resistance and adhesion resistance.

1.3. Reaction Liquid

Next, a description will be given of the reaction liquid used in the ink jet recording method. A detailed description will be given below of the components which are able to be included in the reaction liquid used in the present embodiment.

Here, in the present embodiment, the reaction liquid is an auxiliary liquid which contains a coloring material in an amount of 0.2% by mass or less and which is attached to the recording medium and used before or after attaching the aqueous ink jet ink composition, and the reaction liquid is not the aqueous ink jet ink composition described above used for coloring a recording medium.

1.3.1. Aggregating Agent

The reaction liquid used in the present embodiment preferably contains an aggregating agent for aggregating the components of the ink composition. Due to the reaction liquid including an aggregating agent, in the ink composition attaching step described below, the aggregating agent and the resin included in the aqueous ink jet ink composition react quickly. Then, the dispersed state of the pigment or resin in the ink composition is destroyed, and the pigment and the resin are aggregated. Since this aggregate inhibits permeation of the pigment into the recording medium, it is considered that the inhibition will be excellent in terms of improving the image quality of the recorded image.

Examples of aggregating agents include a polyvalent metal salt, a cationic compound (a cationic resin, a cationic surfactant, or the like), and an organic acid. These aggregating agents may be used alone or in a combination of two kinds or more. Among these aggregating agents, it is preferable to use at least one kind of aggregating agent selected from the group consisting of a polyvalent metal salt and an organic acid from the viewpoint of excellent reactivity with the resin included in the ink composition.

The polyvalent metal salt is formed of divalent or higher polyvalent metal ions and anions bonded to these polyvalent metal ions, and is a compound soluble in water. Specific examples of polyvalent metal ions include divalent metal ions such as $Ca^{2+}$, $Cu^{2+}$, $Ni^{2+}$, $Mg^{2+}$, $Zn^{2+}$, $Ba^{2+}$, and the like; and trivalent metal ions such as $Al^{3+}$, $Fe^{3+}$, and $Cr^{3+}$. Examples of anions include $Cl^-$, $I^-$, $Br^-$, $SO_4^{2-}$, $ClO^{3-}$, $NO^{3-}$, and $HCOO^-$, $CH_3COO^-$, and the like. Among these polyvalent metal salts, calcium salts and magnesium salts are preferable from the viewpoints of stability of the reaction liquid and reactivity as an aggregating agent.

Preferable examples of organic acid include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, derivatives of these compounds, salts thereof, and the like. One type of organic acid may be used alone, or two types or more may be used in combination.

Examples of cationic resins include cationic urethane resins, cationic olefin resins, cationic allylamine resins, and the like.

As the cationic urethane resin, it is possible to appropriate select and use known resins. It is possible to use commercial products as the cationic urethane resins and, for example, it is possible to use Hydran CP-7010, CP-7020, CP-7030, CP-7040, CP-7050, CP-7060, and CP-7610 (the above are trade names manufactured by DIC Corporation), Superflex 600, 610, 620, 630, 640, and 650 (the above are trade names manufactured by DKS Co., Ltd.), urethane emulsion WBR-2120C, and WBR-2122C (the above are trade names manufactured by Taisei Fine Chemical Co., Ltd.), and the like.

The cationic olefin resin has an olefin such as ethylene, propylene or the like in the structural skeleton thereof, and it is possible to appropriately select and use known cationic olefin resins. In addition, the cationic olefin resin may be in an emulsion state of being dispersed in a solvent including water, an organic solvent, or the like. As the cationic olefin resin, it is possible to use commercial products and examples thereof include Arrow Base CB-1200, CD-1200 (the above are trade names manufactured by Unitika Ltd.), and the like.

It is possible to appropriately select and use known resins as the cationic allylamine resins, and examples thereof include polyallylamine hydrochloride, polyallylamine amide sulfate, allylamine hydrochloride-diallylamine hydrochloride copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamine amide sulfate, polymethyldiallylamine acetate, polydiallyldimethylammonium chloride, diallylamine acetate-sulfur dioxide copolymers, diallylmethylethylammoniumethylsulfate-sulfur dioxide copolymers, methyldiallylamine hydrochloride-sulfur dioxide copolymers, diallyldimethylammonium chloride-sulfur dioxide copolymers, diallyldimethylammonium chloride-acrylamide copolymers, and the like. It is possible to use commercial products such as cationic allylamine resins and, for example, it is possible to use PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (the above are trade names manufactured by Nittobo Medical Co., Ltd.), Hymo Neo-600, Himoloc Q-101, Q-311, Q-501, and High Max SC-505 (the above are trade names, Hymo Co., Ltd.), or the like.

Examples of cationic surfactants include primary, secondary, and tertiary amine salt type compounds, alkylamine salts, dialkylamine salts, aliphatic amine salts, benzalkonium salts, quaternary ammonium salts, quaternary alkyl ammonium salts, alkyl pyridinium salts, sulfonium salts, phosphonium salts, onium salts, imidazolinium salts, and the like. Specific examples of cationic surfactants include hydrochloric acid such as laurylamine, Coco amine, and rosinamine, acetates and the like, lauryltrimethylammonium chloride, cetyltrimethylammonium chloride, benzyltributylammonium chloride, benzalkonium chloride, dimethylethyl lauryl ammonium ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The concentration of the aggregating agent in the reaction liquid may be 0.03 mol/kg or more in 1 kg of the reaction liquid. In addition, the concentration may be 0.1 mol/kg or more and 1.5 mol/kg or less, and may be 0.2 mol/kg or more and 0.9 mol/kg or less in 1 kg of the reaction liquid. In addition, the content of the aggregating agent may be 0.1% by mass or more and 25% by mass or less with respect to the total mass (100% by mass) of the reaction liquid, may be 1% by mass or more and 20% by mass or less, and may be 3% by mass or more and 10% by mass or less.

1.3.2. Water

The reaction liquid used in the present embodiment is preferably an aqueous reaction liquid with water as the main solvent. This water is a component which is evaporated and scattered by drying after attaching the reaction liquid to the recording medium. It is preferable that the water be obtained by removing ionic impurities or the like as much as possible like pure water or ultrapure water such as ion-exchanged water, ultra-filtered water, reverse osmosis water, and distilled water. In addition, the use of water sterilized by ultraviolet ray irradiation or addition of hydrogen peroxide or the like is suitable since it is possible to suppress the generation of fungi and bacteria when the reaction liquid is stored for a long time. It is possible to set the content of water included in the reaction liquid to be 40% by mass or more with respect to the total mass (100% by mass) of the reaction liquid, preferably 20% by mass or more, more preferably 30% by mass or more, and even more preferably 40% by mass or more.

1.3.3. Organic Solvent

The reaction liquid used in the present embodiment may contain an organic solvent. Containing an organic solvent improves the wettability of the reaction liquid on the recording medium. As the organic solvent, it is possible to use the same organic solvents as exemplified for the aqueous ink jet ink composition described above. The content of the organic solvent is not particularly limited and is able to be set to, for example, 10% by mass or more and 80% by mass or less with respect to the total mass (100% by mass) of the reaction liquid, and preferably 15% by mass or more and 70% by mass or less.

It is possible to contain the standard boiling point of the organic solvent in the preferable temperature range of the standard boiling point of the organic solvent which may be contained in the ink composition described above, independently of the standard boiling point of the organic solvent which may be contained in the ink composition. Alternatively, the standard boiling point of the organic solvent is preferably 180° C. or higher, more preferably 180° C. to 300° C., even more preferably 190° C. to 270° C., and particularly preferably 200° C. to 250° C.

Here, in the reaction liquid, as the organic solvent, in the same manner as the aqueous ink jet ink composition described above, the content of the water-soluble organic solvent having a standard boiling point of higher than 280° C. is preferably 5% by mass or less, more preferably 3% by mass or less, even more preferably 2% by mass or less, yet more preferably 1% by mass or less, and even more preferably 0.5% by mass or less. In such a case, since the drying property of the reaction liquid is good, not only is drying of the reaction liquid quickly performed, but the obtained recorded matter is excellent in terms of abrasion resistance and having reduced tackiness.

1.3.4. Surfactant

A surfactant may be added to the reaction liquid used in the present embodiment. Adding the surfactant makes it possible to lower the surface tension of the reaction liquid and to improve the wettability on the recording medium. Among the surfactants, for example, it is possible to preferably use an acetylene glycol-based surfactant, a silicone-based surfactant, or a fluorine-based surfactant. As specific examples of these surfactants, it is possible to use the same surfactants as exemplified for the aqueous ink jet ink composition described below. The content of the surfactant is not particularly limited, but it is possible to set the content to be 0.1% by mass or more and 5% by mass or less with respect to the total mass (100% by mass) of the reaction liquid.

1.3.5. Other Components

The pH adjusting agent, preservatives/fungicides, rust inhibitor, chelating agent, and the like as described above may be added to the reaction liquid used in the present embodiment, as necessary.

1.3.6. Method of Preparing Reaction Liquid

It is possible to manufacture the reaction liquid used in the present embodiment by dispersing and mixing the respective components described above by an appropriate method. After thoroughly stirring each of the above components, filtration is carried out in order to remove coarse particles and foreign matter which cause clogging to obtain the desired reaction liquid.

1.3.7. Physical Properties of Reaction Liquid

In a case where the reaction liquid is ejected from an ink jet head, the surface tension at 20° C. is preferably 18 mN/m or more and 40 mN/m or less, more preferably 20 mN/m or more and 35 mN/m or less, and even more preferably 22 mN/m or more and 33 mN/m or less. For the measurement of the surface tension, for example, it is possible to carry out measurement by confirming the surface tension when a platinum plate is wetted with the reaction liquid in an environment of 20° C. using an automatic surface tensiometer CBVP-Z (trade name, manufactured by Kyowa Interface Science Co., Ltd.).

In addition, from the same viewpoint, the viscosity of the reaction liquid used in the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Physica) under an environment of 20° C.

1.4. Recording Medium

Since the aqueous ink jet ink composition described above has an ink drying property, it is possible to obtain an image with excellent image quality and abrasion resistance when recording on recording media with an ink absorbing property or an ink non-absorbing property or low ink absorbing property. In particular, it is possible to preferably use the aqueous ink jet ink composition described above which is able to obtain an image with excellent image quality and abrasion resistance when recording on recording media with an ink non-absorbing property or low ink absorbing property.

Examples of recording media with an ink absorbing property include plain paper such as high-quality paper and recycled paper, ink jet specialty paper provided with an ink receiving layer having an ink absorbing property, and the like.

Examples of recording media with an ink non-absorbing property include a plastic film which is not surface-treated for ink jet recording (that is, on which an ink absorbing layer is not formed), a recording medium where plastic is coated on a base material such as paper, a recording medium to which a plastic film is bonded, or the like. Examples of plastics here include polyvinyl chloride, polyethylene terephthalate, polycarbonate, polystyrene, polyurethane, polyethylene, polypropylene, and the like. Examples of recording media with a low ink absorbing property include printing paper such as art paper, coated paper, and matte paper. In the present specification, a recording medium with an ink non-absorbing property or with a low ink absorbing property is also referred to simply as a "plastic medium".

Here, the "recording medium with an ink non-absorbing property or with a low ink absorbing property" in the present specification means a "recording medium having a water absorption amount of 10 mL/m$^2$ or less from the start of contact to 30 msec$^{1/2}$ in the Bristow method". This Bristow method is the most popular method as a method for measuring the amount of liquid absorption in a short time and is also adopted by Japan Technical Association of the Pulp and Paper Industry (JAPAN TAPPI). The details of the test method are described in the standard No. 51 "Paper and paperboard-Liquid absorbing property test method-Bristow method" in "JAPAN TAPPI 2000 Paper Pulp Test Method".

Examples of recording media with an ink non-absorbing property include a plastic film which does not have an ink absorbing layer, a recording medium where plastic is applied on a base material such as paper, a recording medium having a plastic film adhering thereto, and the like. Examples of plastics here include polyvinyl chloride, polyethylene terephthalate, polycarbonate, polystyrene, polyurethane, polyethylene, polypropylene, and the like.

Examples of recording media with a low ink absorbing property include a recording medium provided with a coating layer for receiving ink on the surface thereof, for example, in a case of a recording medium where the base material is paper, examples include printing paper such as art paper, coated paper, and matte paper, in a case of a recording medium where the base material is a plastic film, examples include recording media in which a hydrophilic polymer is coated on the surface of polyvinyl chloride, polyethylene terephthalate, polycarbonate, polystyrene, polyurethane, polyethylene, polypropylene or the like, or recording media in which particles such as silica or titanium are coated with a binder. These recording media may be transparent recording media.

In addition, it is possible to suitably use the above for recording medium with an ink non-absorbing property or a low ink absorbing property having irregularities on the surface thereof such as embossed media.

Here, in a case where the ink jet recording apparatus 1 is a serial type (multi-pass type) recording apparatus, the width of the recording medium width is preferably 3.2 m or less. In such a case, the time during which the recording medium opposes the ink jet head 2 during one main scan, that is, the time during which the nozzles 22 not used during one scan receive heat from the recording medium is 12 seconds or shorter, it is possible to suppress drying and composition variations of the ink composition in the nozzles, and it is possible to reduce the deposition of the resin on the inner wall of the nozzle. As a result, it is possible to suppress landing deviation of the ink during continuous printing, and the clogging recoverability of the nozzles 22 is also good and the ejection stability is good. Here, the lower limit of the preferable recording medium width is 30 cm or more.

2. Ink Jet Recording Method

The ink jet recording method according to the present embodiment is provided with an ink composition attaching step of ejecting the aqueous ink jet ink composition according to the present embodiment described above from the ink jet head and attaching the ink composition to the recording medium. A description will be given below of the ink jet recording method according to the present embodiment with reference to the drawings.

2.1. Reaction Liquid Attaching Step

The reaction liquid attaching step is a step in which, for example, before the attachment of the aqueous ink jet ink composition, the reaction liquid described above reacting with the aqueous ink jet ink composition is attached to the recording medium. Attaching the reaction liquid to the recording medium makes it possible to improve the abrasion resistance and image quality.

The reaction liquid attaching step may be before the attachment of the aqueous ink jet ink composition, after the attachment of the aqueous ink jet ink composition, or may also be during the attachment of the aqueous ink jet ink composition. In a case of attaching the reaction liquid before the attachment of the aqueous ink jet ink composition, the recording medium M is preferably heated by the preheater 7 shown in FIG. 1 before the reaction liquid attaching step or heated by the IR heater 3 or the platen heater 4 shown in FIG. 1 during the reaction liquid attaching step. Attaching the reaction liquid to the heated recording medium M makes it possible to easily spread the reaction liquid ejected on the recording medium M over the recording medium M and to uniformly coat the reaction liquid. Therefore, the ink attached in the ink composition attaching step described below reacts sufficiently with the reaction liquid and it is possible to obtain excellent image quality. In addition, since the reaction liquid is uniformly coated on the recording medium M, it is possible to reduce the coating amount, and to prevent a decrease in abrasion resistance of the obtained image.

Here, it is possible to set the surface temperature of the recording medium M during the attachment of the reaction liquid independently of the temperature within the preferable range of the surface temperature (primary heating temperature) of the recording medium M during the attachment of the ink described below. For example, the surface temperature of the recording medium M when attaching the reaction liquid is preferably 45° C. or lower, more preferably 40° C. or lower, and even more preferably 38° C. or lower. In addition, the lower limit of the surface temperature of the recording medium M when attaching the reaction liquid is preferably 30° C. or higher, and more preferably 32° C. or higher. In a case where the surface temperature of the recording medium M during the attachment of the reaction liquid is in the above range, it is possible to uniformly apply the reaction liquid to the recording medium M, and to improve the abrasion resistance and the image quality. In addition, it is possible to suppress the influence of heat on the ink jet head 2.

Here, attachment of the reaction liquid may be performed by ejection by the ink jet head 2, and examples of other methods include a method of coating the reaction liquid with a roll coater or the like, a method of ejecting the reaction liquid, and the like.

2.2. Ink Composition Attaching Step

The ink composition attaching step is a step of ejecting and attaching the aqueous ink composition described above from the ink jet head 2, and by this step, an image formed of the ink composition is formed on the surface of the recording medium M. In addition, in a case of having a reaction liquid attaching step, the ink and the reaction liquid react on the recording medium M, and the image quality is improved.

Here, in the present embodiment, "image" indicates a recording pattern formed from a group of dots, including text printing and solid images. Here, "solid image" means an image pattern in which dots are recorded in all pixels of the pixels which are the minimum recording unit region defined by a recording resolution, and in which the recording region of the recording medium is normally covered with ink and the base of the recording medium is not visible.

The maximum attached amount of the aqueous ink jet ink composition per unit area on the recording medium M is preferably 5 mg/inch$^2$ or more, more preferably 7 mg/inch$^2$ or more, and even more preferably 10 mg/inch$^2$ or more. The upper limit of the attachment amount of the aqueous ink jet ink composition per unit area of the recording medium is not particularly limited, but is, for example, preferably 20 mg/inch$^2$ or less, more preferably 15 mg/inch$^2$ or less, and particularly preferably 13 mg/inch$^2$ or less.

The ink composition attaching step may be provided with a heating step of heating the recording medium M with the IR heater 3 or the platen heater 4 at the same time as the ink composition attaching step or before the ink composition attaching step, and the ink composition attaching step is preferably performed on the recording medium M heated by the heating step. Due to this, it is possible to quickly dry the ink on the recording medium M, and bleeding is suppressed. In addition, it is possible to form an image with excellent abrasion resistance, adhesion resistance, and image quality, and using the ink described above makes it possible to provide an ink jet recording method with excellent ejection stability.

The surface temperature (primary heating temperature) of the recording medium M at the time of attaching the ink is preferably 60° C. or lower, more preferably 55° C. or lower, even more preferably 45° C. or lower, particularly preferably 40° C. or lower, and yet more preferably 38° C. or lower. The surface temperature of the recording medium at the time of attaching the ink being within the above range makes it possible to suppress the influence of heat on the ink jet head 2 and to prevent clogging of the nozzle 22. In addition, the lower limit of the surface temperature of the recording medium M at the time of ink jet recording is preferably 25° C. or higher, more preferably 30° C. or higher, even more preferably 32° C. or higher, and particularly preferably 35° C. or higher. The surface temperature of the recording medium M during ink jet recording being in the range described above makes it possible to quickly dry the ink on the recording medium M, to suppress bleeding, and to form an image with excellent abrasion resistance, adhesion resistance, and image quality.

Here, in a case where the ink jet recording apparatus 1 is a serial type recording apparatus, it is preferable that the time during which the recording medium opposes the ink jet head 2 during one main scan be 12 seconds or shorter. The upper limit of this time is more preferably 10 seconds or shorter, and particularly preferably 6 seconds or shorter. The lower limit of this time is preferably 1 second or longer, more preferably 2 seconds or longer, even more preferably 3 seconds or longer, and particularly preferably 4 seconds or longer. The time during which the recording medium M opposes the ink jet head 2 during one main scan is equal to the time during which the nozzle 22 not used during one scan receives heat from the recording medium M. In other words, if the time is within the above range, since the time during which the nozzles 22 not used during one main scan receive heat from the recording medium M is sufficiently short, it is possible to suppress the drying and composition variation of the ink composition in the nozzle and to reduce the deposition of the resin on the inner wall of the nozzles. As a result, it is possible to suppress landing deviation of the ink during continuous printing and the ejection stability is also further improved. In addition, a case where the time described above is in the above range or more is preferable in terms of being able to record on a recording medium having a long recording medium scanning width and in terms of designing the recording apparatus easily, and even in the case of performing such recording, the present embodiment is particularly useful in terms of being able to obtain ejection stability.

2.3. Secondary Heating Step

The ink jet recording method according to the present embodiment may have a secondary heating step of heating the recording medium M to which the aqueous ink jet ink composition is attached by the curing heater 5 shown in FIG. 1 after the ink composition attaching step described above. Due to this, the resin and the like included in the aqueous ink jet ink composition on the recording medium M are melted to form an ink film. In this manner, the ink film firmly fixes (adheres) to the recording medium M, and it is possible to obtain a high-quality image with excellent abrasion resistance in a short time.

The temperature (secondary heating temperature) at which the surface of the recording medium M is heated by the curing heater 5 is preferably 40° C. or higher and 120° C. or lower, more preferably 60° C. or higher and 100° C. or lower, and even more preferably 80° C. or higher and 90° C. or lower. The heating temperature being within the above range further improves the abrasion resistance of the obtained recorded matter and makes it possible to form an ink film on the recording medium M with high adhesion.

Here, after the secondary heating step, there may be a step of cooling the ink composition on the recording medium M using the cooling fan 6 shown in FIG. 1.

2.4. Cleaning Step

The ink jet recording method according to the present embodiment may be provided with a cleaning step of discharging the ink composition and the reaction liquid by a unit other than a pressure generating unit for recording by ejecting ink, that is, by a mechanism other than the mechanism for ejecting ink for recording provided in the ink jet head 2.

Examples of mechanisms for ejecting ink for recording provided in the ink jet head 2 include a piezo element provided in the pressure chamber 21 and applying pressure to the ink and a heater element. The cleaning step may be a step of externally applying pressure to the ink jet head 2 to discharge the aqueous ink jet ink composition from the nozzle 22. Even in a case where there is a concern that the resin will be deposited on the inner wall of the ink jet head 2, providing this step makes it possible to suppress the deposition and to further improve the ejection stability.

In addition, in the ink jet recording method according to the present embodiment, it is preferable to control the ink jet recording apparatus 1 so as to perform recording for one hour or longer without performing the above cleaning step, that is, without cleaning. By carrying out the control in this manner, there is no reduction in the recording speed due to interruption of recording due to the cleaning step. In addition, in the present embodiment, even in the case of not carrying out cleaning, using the ink composition described above makes it possible to suppress clogging of the ink jet head 2 so as to obtain ejection stability and to record a good image with excellent abrasion resistance and adhesion resistance.

Here, examples of the other mechanisms described above include a mechanism for applying pressure such as application of suction (negative pressure) or the application of positive pressure from the upstream of the head. These mechanisms are not ink discharging (flushing) using a function of the ink jet head itself. In other words, these mechanisms are not discharging using the function of ejecting ink from the ink jet head in recording.

In addition, the recording time may not be continuous, and recording may be paused unless pressure is externally applied to the ink jet head to discharge the aqueous ink jet ink composition from the nozzle. Here, the recording time is the time required for recording including the scanning and the stop time between scanning. The recording time is preferably 1 hour or longer, more preferably 1.5 hours or longer, even more preferably 2 hours or longer, and particularly preferably 3 hours or longer. The upper limit of the recording time is not limited, but is preferably 10 hours or shorter, more preferably 5 hours or shorter, and even more preferably 4 hours or shorter.

In addition, the ink jet recording method according to the present embodiment is preferable in the point described above that, when performing recording one time, the cleaning step described above is not performed during recording. In addition, even if the above-described cleaning step is performed at least either before recording or after recording, the ink jet recording method according to the present embodiment is preferable in view of the point described above.

As described above, in the aqueous ink jet ink composition and the ink jet recording method according to the present embodiment, the aqueous ink jet ink composition containing a non-ionic surfactant and the acid value being in a predetermined range or less makes it possible to obtain dispersion stability of the pigment in a case of including resin fine particles and a dispersant resin, and to provide an aqueous ink jet ink composition and ink jet recording method which are able to obtain recorded matter with excellent abrasion resistance and adhesion resistance while securing the ejection stability during recording.

3. Examples

A more specific description will be given below of embodiments of the invention with reference to Examples and Comparative Examples, but the present embodiment is not limited to only these Examples.

3.1. Ink

The respective components were mixed and stirred at the blending ratios described in Tables 1 to 3 so as to obtain the respective inks of Examples 1 to 20 and Comparative Examples 1 to 9. The numerical values in Tables 1 to 3 all indicate % by mass, and pure water was added so that the total mass of the ink was 100% by mass. In addition, the pigment, the dispersant resin, and the resin fine particles are values in terms of solid content.

TABLE 1

| | | Resin acid value (mg KOH/g) | Example 1 | Example 2 | Example 3 | Example 4 | Example 5 | Example 6 |
|---|---|---|---|---|---|---|---|---|
| Pigment (solid content) | Pigment 1 | | 4 | 4 | 4 | 4 | 4 | 4 |
| | Pigment 2 | | | | | | | |
| Dispersant resin (solid content) | Dispersant 1 | 238 | | | | | | |
| | Dispersant 2 | 108 | 0.5 | 0.5 | 0.5 | 0.5 | 0.5 | 0.5 |
| | Dispersant 3 | 53 | | | | | | |
| Resin fine particle (solid content) | Resin emulsion 1 | 23 | 6 | | | | | |
| | Resin emulsion 2 | 10 | | 6 | 3 | 6 | 6 | 6 |
| | Resin emulsion 3 | 54 | | | | | | |
| Non-ionic surfactant | Surfactant 1 (non-ionic) | | 0.5 | 0.5 | 0.5 | | | |
| | Surfactant 2 (non-ionic) | | | | | 0.5 | | |
| | Surfactant 3 (non-ionic) | | | | | | 0.5 | |
| | Surfactant 4 (non-ionic) | | | | | | | 0.5 |
| | Surfactant 5 (non-ionic) | | | | | | | |
| | Surfactant 6 (non-ionic) | | | | | | | |
| | Surfactant 7 (non-ionic) | | | | | | | |
| Other surfactants | Surfactant 8 (anionic) | | | | | | | |
| Resin dissolving solvent | 2-pyrrolidone | | 8 | 8 | 8 | 8 | 8 | 8 |
| | 3-methoxy-N,N-dimethylpropionamide | | | | | | | |
| | γ-butyrolactone | | | | | | | |
| Other solvents | 1,2-pentanediol | | 3 | 3 | 3 | 3 | 3 | 3 |
| | Diethyleneglycol | | 7 | 7 | 7 | 7 | 7 | 7 |
| | Glycerin | | | | | | | |
| Water | | | Remainder | Remainder | Remainder | Remainder | Remainder | Remainder |
| Total | | | 100 | 100 | 100 | 100 | 100 | 100 |
| Acid value of resin fine particles (mg KOH/100 g ink) | | | 138.0 | 60.0 | 30.0 | 60.0 | 60.0 | 60.0 |
| Acid value of dispersant resin (mg KOH/100 g ink) | | | 54.0 | 54.0 | 54.0 | 54.0 | 54.0 | 54.0 |
| Acid value of resin fine particles + dispersant resin (mg KOH/100 g ink) | | | 192.0 | 114.0 | 84.0 | 114.0 | 114.0 | 114.0 |
| Ink storage stability | | | A | A | B | A | A | B |
| Primary heating temperature (° C.) | | | 35 | 35 | 35 | 35 | 35 | 35 |
| Recording medium type | | | Recording medium 1 | Recording medium 1 | Recording medium 1 | Recording medium 1 | Recording medium 1 | Recording medium 1 |
| Reaction liquid | | | Reaction liquid 1 | Reaction liquid 1 | Reaction liquid 1 | Reaction liquid 1 | Reaction liquid 1 | Reaction liquid 1 |
| Recording method evaluation | Ejection stability | | B | A | A | A | A | B |
| | Clogging recoverability | | A | A | A | A | A | B |
| | Abrasion resistance | | A | B | A | B | B | B |
| | Blocking resistance | | C | B | B | B | B | C |
| | Image quality | | B | B | B | B | B | A |

| | | Resin acid value (mg KOH/g) | Example 7 | Example 8 | Example 9 | Example 10 |
|---|---|---|---|---|---|---|
| Pigment (solid content) | Pigment 1 | | 4 | 4 | 4 | 4 |
| | Pigment 2 | | | | | |
| Dispersant resin (solid content) | Dispersant 1 | 238 | | | | |
| | Dispersant 2 | 108 | 0.5 | 0.5 | 0.5 | 0.5 |
| | Dispersant 3 | 53 | | | | |
| Resin fine particle (solid content) | Resin emulsion 1 | 23 | | | | |
| | Resin emulsion 2 | 10 | 6 | 6 | 6 | 6 |
| | Resin emulsion 3 | 54 | | | | |
| Non-ionic surfactant | Surfactant 1 (non-ionic) | | | | | 0.3 |
| | Surfactant 2 (non-ionic) | | | | | |
| | Surfactant 3 (non-ionic) | | | | | |
| | Surfactant 4 (non-ionic) | | | | | |
| | Surfactant 5 (non-ionic) | | 0.5 | | | 0.2 |
| | Surfactant 6 (non-ionic) | | | 0.5 | | |
| | Surfactant 7 (non-ionic) | | | | 0.5 | |

TABLE 1-continued

|  |  |  |  |  |  |
|---|---|---|---|---|---|
| Other surfactants | Surfactant 8 (anionic) |  |  |  |  |
| Resin dissolving solvent | 2-pyrrolidone | 8 | 8 | 8 | 8 |
|  | 3-methoxy-N,N-dimethylpropionamide |  |  |  |  |
|  | γ-butyrolactone |  |  |  |  |
| Other solvents | 1,2-pentanediol | 3 | 3 | 3 | 3 |
|  | Diethyleneglycol | 7 | 7 | 7 | 7 |
|  | Glycerin |  |  |  |  |
| Water |  | Remainder | Remainder | Remainder | Remainder |
| Total |  | 100 | 100 | 100 | 100 |
| Acid value of resin fine particles (mg KOH/100 g ink) |  | 60.0 | 60.0 | 60.0 | 60.0 |
| Acid value of dispersant resin (mg KOH/100 g ink) |  | 54.0 | 54.0 | 54.0 | 54.0 |
| Acid value of resin fine particles + dispersant resin (mg KOH/100 g ink) |  | 114.0 | 114.0 | 114.0 | 114.0 |
| Ink storage stability |  | B | B | B | A |
| Primary heating temperature (° C.) |  | 35 | 35 | 35 | 35 |
| Recording medium type |  | Recording medium 1 | Recording medium 1 | Recording medium 1 | Recording medium 1 |
| Reaction liquid |  | Reaction liquid 1 | Reaction liquid 1 | Reaction liquid 1 | Reaction liquid 1 |
| Recording method evaluation | Ejection stability | B | B | B | A |
|  | Clogging recoverability | B | B | C | A |
|  | Abrasion resistance | B | B | B | B |
|  | Blocking resistance | C | C | C | B |
|  | Image quality | A | A | A | A |

TABLE 2

|  |  | Resin acid value (mg KOH/g) | Example 11 | Example 12 | Example 13 | Example 14 | Example 15 |
|---|---|---|---|---|---|---|---|
| Pigment (solid content) | Pigment 1 |  | 4 | 4 | 4 |  | 4 |
|  | Pigment 2 |  |  |  |  | 4 |  |
| Dispersant resin (solid content) | Dispersant 1 | 238 |  |  |  |  |  |
|  | Dispersant 2 | 108 | 0.5 | 0.5 | 0.5 |  |  |
|  | Dispersant 3 | 53 |  |  |  |  | 0.5 |
| Resin fine particle (solid content) | Resin emulsion 1 | 23 |  |  |  |  |  |
|  | Resin emulsion 2 | 10 | 6 | 6 |  |  |  |
|  | Resin emulsion 3 | 54 |  |  | 6 | 6 | 6 |
| Non-ionic surfactant | Surfactant 1 (non-ionic) |  | 0.5 | 0.5 | 0.5 | 0.5 | 0.5 |
|  | Surfactant 2 (non-ionic) |  |  |  |  |  |  |
|  | Surfactant 3 (non-ionic) |  |  |  |  |  |  |
|  | Surfactant 4 (non-ionic) |  |  |  |  |  |  |
|  | Surfactant 5 (non-ionic) |  |  |  |  |  |  |
|  | Surfactant 6 (non-ionic) |  |  |  |  |  |  |
|  | Surfactant 7 (non-ionic) |  |  |  |  |  |  |
| Other surfactants | Surfactant 8 (anionic) |  |  |  |  |  |  |
| Resin dissolving solvent | 2-pyrrolidone |  |  | 8 | 8 | 8 | 8 |
|  | 3-methoxy-N,N-dimethylpropionamide |  | 8 |  |  |  |  |
|  | γ-butyrolactone |  |  | 8 |  |  |  |
| Other solvents | 1,2-pentanediol |  | 3 | 3 | 3 | 3 | 3 |
|  | Diethyleneglycol |  | 7 | 7 | 7 | 7 | 7 |
|  | Glycerin |  |  |  | 5 |  |  |
| Water |  |  | Remainder | Remainder | Remainder | Remainder | Remainder |
| Total |  |  | 100 | 100 | 100 | 100 | 100 |
| Acid value of resin fine particles (mg KOH/100 g ink) |  |  | 60.0 | 60.0 | 138.0 | 138.0 | 138.0 |
| Acid value of dispersant resin (mg KOH/100 g ink) |  |  | 54.0 | 54.0 | 54.0 | 0.0 | 26.5 |
| Acid value of resin fine particles + dispersant resin (mg KOH/100 g ink) |  |  | 114.0 | 114.0 | 192.0 | 138.0 | 164.5 |
| Ink storage stability |  |  | A | A | A | A | A |
| Primary heating temperature (° C.) |  |  | 35 | 35 | 35 | 35 | 35 |
| Recording medium type |  |  | Recording medium 1 | Recording medium 1 | Recording medium 1 | Recording medium 1 | Recording medium 1 |
| Reaction liquid |  |  | Reaction liquid 1 | Reaction liquid 1 | Reaction liquid 1 | Reaction liquid 1 | Reaction liquid 1 |
| Recording method evaluation | Ejection stability |  | B | B | A | A | B |
|  | Clogging recoverability |  | B | B | A | A | A |
|  | Abrasion resistance |  | A | A | C | B | A |
|  | Blocking resistance |  | A | A | C | B | B |
|  | Image quality |  | A | A | C | C | B |

TABLE 2-continued

| | | Resin acid value (mg KOH/g) | Example 16 | Example 17 | Example 18 | Example 19 | Example 20 |
|---|---|---|---|---|---|---|---|
| Pigment (solid content) | Pigment 1 | | 4 | 4 | 4 | 4 | 4 |
| | Pigment 2 | | | | | | |
| Dispersant resin (solid content) | Dispersant 1 | 238 | | | | | |
| | Dispersant 2 | 108 | 0.5 | 0.5 | 0.5 | 0.5 | 0.5 |
| | Dispersant 3 | 53 | | | | | |
| Resin fine particle (solid content) | Resin emulsion 1 | 23 | 6 | | | 6 | 6 |
| | Resin emulsion 2 | 10 | | 6 | 6 | | |
| | Resin emulsion 3 | 54 | | | | | |
| Non-ionic surfactant | Surfactant 1 (non-ionic) | | 0.5 | 0.5 | 0.5 | 0.5 | 0.5 |
| | Surfactant 2 (non-ionic) | | | | | | |
| | Surfactant 3 (non-ionic) | | | | | | |
| | Surfactant 4 (non-ionic) | | | | | | |
| | Surfactant 5 (non-ionic) | | | | | | |
| | Surfactant 6 (non-ionic) | | | | | | |
| | Surfactant 7 (non-ionic) | | | | | | |
| Other surfactants | Surfactant 8 (anionic) | | | | | | |
| Resin dissolving solvent | 2-pyrrolidone | | 8 | 8 | 8 | 8 | 8 |
| | 3-methoxy-N,N-dimethylpropionamide | | | | | | |
| | γ-butyrolactone | | | | | | |
| Other solvents | 1,2-pentanediol | | 3 | 3 | 3 | 3 | 3 |
| | Diethyleneglycol | | 7 | 7 | 7 | 7 | 7 |
| | Glycerin | | | | | | |
| Water | | | Remainder | Remainder | Remainder | Remainder | Remainder |
| Total | | | 100 | 100 | 100 | 100 | 100 |
| Acid value of resin fine particles (mg KOH/100 g ink) | | | 138.0 | 60.0 | 60.0 | 138.0 | 138.0 |
| Acid value of dispersant resin (mg KOH/100 g ink) | | | 54.0 | 54.0 | 54.0 | 54.0 | 54.0 |
| Acid value of resin fine particles + dispersant resin (mg KOH/100 g ink) | | | 192.0 | 114.0 | 114.0 | 192.0 | 192.0 |
| Ink storage stability | | | A | A | A | A | A |
| Primary heating temperature (° C.) | | | 35 | 35 | 45 | 35 | 35 |
| Recording medium type | | | Recording medium 2 | Recording medium 1 | Recording medium 1 | Recording medium 2 | Recording medium 2 |
| Reaction liquid | | | Reaction liquid 1 | — | Reaction liquid 1 | Reaction liquid 2 | Reaction liquid 3 |
| Recording method evaluation | Ejection stability | | B | A | B | B | B |
| | Clogging recoverability | | A | A | A | A | A |
| | Abrasion resistance | | B | A | B | A | A |
| | Blocking resistance | | B | A | B | A | A |
| | Image quality | | B | D | A | B | C |

TABLE 3

| | | Resin acid value (mg KOH/g) | Comparative Example 1 | Comparative Example 2 | Comparative Example 3 | Comparative Example 4 |
|---|---|---|---|---|---|---|
| Pigment (solid content) | Pigment 1 | | 4 | 4 | 4 | 4 |
| | Pigment 2 | | | | | |
| Dispersant resin (solid content) | Dispersant 1 | 238 | | | | |
| | Dispersant 2 | 108 | 0.5 | 0.5 | 0.5 | 0.5 |
| | Dispersant 3 | 53 | | | | |
| Resin fine particle (solid content) | Resin emulsion 1 | 23 | 10 | | | |
| | Resin emulsion 2 | 10 | | | | 6 |
| | Resin emulsion 3 | 54 | | 6 | 6 | |
| Non-ionic surfactant | Surfactant 1 (non-ionic) | | 0.5 | 0.5 | | |
| | Surfactant 2 (non-ionic) | | | | | |
| | Surfactant 3 (non-ionic) | | | | | |
| | Surfactant 4 (non-ionic) | | | | | |
| | Surfactant 5 (non-ionic) | | | | | |
| | Surfactant 6 (non-ionic) | | | | | |
| | Surfactant 7 (non-ionic) | | | | | |
| Other surfactants | Surfactant 8 (anionic) | | | | | 0.5 |
| Resin dissolving solvent | 2-pyrrolidone | | 8 | 8 | 8 | 8 |
| | 3-methoxy-N,N-dimethylpropionamide | | | | | |
| | γ-butyrolactone | | | | | |

TABLE 3-continued

| | | | | | |
|---|---|---|---|---|---|
| Other solvents | 1,2-pentanediol | 3 | 3 | 3 | 3 |
| | Diethyleneglycol | 7 | 7 | 7 | 7 |
| | Glycerin | | | | |
| Water | | Remainder | Remainder | Remainder | Remainder |
| Total | | 100 | 100 | 100 | 100 |
| Acid value of resin fine particles (mg KOH/100 g ink) | | 230.0 | 324.0 | 324.0 | 60.0 |
| Acid value of dispersant resin (mg KOH/100 g ink) | | 54.0 | 54.0 | 54.0 | 54.0 |
| Acid value of resin fine particles + dispersant resin (mg KOH/100 g ink) | | 284.0 | 378.0 | 378.0 | 114.0 |
| Ink storage stability | | B | B | C | B |
| Primary heating temperature (° C.) | | 35 | 35 | 35 | 35 |
| Recording medium type | | Recording medium 1 | Recording medium 1 | Recording medium 1 | Recording medium 1 |
| Reaction liquid | | Reaction liquid 1 | Reaction liquid 1 | Reaction liquid 1 | Reaction liquid 1 |
| Recording method evaluation | Ejection stability | C | C | C | C |
| | Clogging recoverability | B | B | C | C |
| | Abrasion resistance | A | B | A | B |
| | Blocking resistance | C | C | C | C |
| | Image quality | B | B | C | C |

| | | Resin acid value (mg KOH/g) | Comparative Example 5 | Comparative Example 6 | Comparative Example 7 | Comparative Example 8 |
|---|---|---|---|---|---|---|
| Pigment (solid content) | Pigment 1 | | 4 | 4 | 4 | 4 |
| | Pigment 2 | | | | | |
| Dispersant resin (solid content) | Dispersant 1 | 238 | | | | 0.5 |
| | Dispersant 2 | 108 | 0.5 | 0.5 | 0.5 | |
| | Dispersant 3 | 53 | | | | |
| Resin fine particle (solid content) | Resin emulsion 1 | 23 | | 6 | | 6 |
| | Resin emulsion 2 | 10 | 6 | | | |
| | Resin emulsion 3 | 54 | | | 6 | |
| Non-ionic surfactant | Surfactant 1 (non-ionic) | | | 0.5 | | 0.5 |
| | Surfactant 2 (non-ionic) | | | | | |
| | Surfactant 3 (non-ionic) | | | | | |
| | Surfactant 4 (non-ionic) | | | | | |
| | Surfactant 5 (non-ionic) | | | | | |
| | Surfactant 6 (non-ionic) | | | | | |
| | Surfactant 7 (non-ionic) | | | | | |
| Other surfactants | Surfactant 8 (anionic) | | | | | |
| Resin dissolving solvent | 2-pyrrolidone | | 8 | | | 8 |
| | 3-methoxy-N,N-dimethylpropionamide | | | | | |
| | γ-butyrolactone | | | | | |
| Other solvents | 1,2-pentanediol | | 3 | 8 | 3 | 3 |
| | Diethyleneglycol | | 7 | 10 | 7 | 7 |
| | Glycerin | | | | | |
| Water | | | Remainder | Remainder | Remainder | Remainder |
| Total | | | 100 | 100 | 100 | 100 |
| Acid value of resin fine particles (mg KOH/100 g ink) | | | 60.0 | 138.0 | 324.0 | 138.0 |
| Acid value of dispersant resin (mg KOH/100 g ink) | | | 54.0 | 54.0 | 54.0 | 119.0 |
| Acid value of resin fine particles + dispersant resin (mg KOH/100 g ink) | | | 114.0 | 192.0 | 378.0 | 257.0 |
| Ink storage stability | | | C | A | B | B |
| Primary heating temperature (° C.) | | | 35 | 35 | 35 | 35 |
| Recording medium type | | | Recording medium 1 | Recording medium 1 | Recording medium 1 | Recording medium 1 |
| Reaction liquid | | | Reaction liquid 1 | Reaction liquid 1 | Reaction liquid 1 | Reaction liquid 1 |
| Recording method evaluation | Ejection stability | | C | A | A | C |
| | Clogging recoverability | | C | A | A | B |
| | Abrasion resistance | | A | D | D | B |
| | Blocking resistance | | B | D | D | B |
| | Image quality | | C | B | A | B |

The details of the substances described in Tables 1 to 3 are as follows.

Pigment

Pigment 1: Carbon black

Pigment 2: Carbonyl group-containing self-dispersible pigment, trade name "Cab-O-Jet 300" manufactured by Cabot Corp.

The pigment 1 was used after being prepared as a pigment dispersion liquid using a dispersant resin.

Dispersant Resin

The dispersant resin is a styrene-acryl-based resin of a copolymer of a (meth)acrylic acid, a (meth)acrylate monomer and styrene. Dispersant Resin 1 was prepared by the following method.

A mixture of 7 g of styrene, 56 g of methyl methacrylate, 27 g of butyl acrylate, 30 g of butyl methacrylate, 15 g of acrylic acid, 15 g of methacrylic acid, and 3.6 g of tert-butyl peroxy-2-ethylhexanoate were added dropwise over 1.5 hours to 200 g of toluene kept at 100° C. After completion of the dropwise addition, the mixture was reacted at 100° C. for 2 hours and then cooled to obtain a resin solution. The resin was purified from the resin solution with hexane to obtain Pigment Dispersion Resin 1. Based on this, the acid value was adjusted by changing the ratio with the monomer species such that the acid value of the pigment dispersant was the acid value as shown in Tables 1 to 3. Dispersant resins 2 and 3 were separately prepared in the same manner by adjusting the acid value by changing the monomer species and ratio such that the acid value was the acid value of the resins shown in Tables 1 to 3.

Next, the pigment was dispersed.

Preparation of Pigment Dispersion Liquid 0.6 g of N,N-dimethylaminoethanol was dissolved in g of ion-exchanged water, and 15 g of the pigment was added thereto along with the mass of the dispersant resin prepared above for each example such that the mass ratio with respect to the pigment was as shown in Tables 1 to 3, the mixture was dispersed in a paint shaker using zirconia beads to obtain a pigment dispersion liquid. Here, this dispersant resin is not an emulsion and has a property different from the resin of the above resin fine particles.

Resin Fine Particles

The resin fine particles are a copolymer of styrene, acrylic acid, and an acrylate monomer. Resin fine particles 1 were prepared as follows.

100 parts of ion-exchanged water were added to a reaction container provided with a dropping device, a thermometer, a water-cooled reflux condenser, and a stirrer, 0.2 parts of ammonium persulfate as a polymerization initiator was added at 70° C. in a nitrogen atmosphere while stirring, a monomer solution in which 20 parts of styrene, 17 parts of methyl acrylate, 30 parts of methyl methacrylate, and 5 parts of acrylic acid were added was added dropwise into a reaction container and reacted to polymerize and produce a shell polymer. Thereafter, a mixed solution of 0.2 parts of potassium persulfate, 50 parts of styrene, and 22 parts of n-butyl acrylate was added dropwise thereto and a polymerization reaction was carried out at 70° C. while stirring, then adjusted to pH 8 to 8.5 by being neutralized with sodium hydroxide and filtrated through a 0.3 μm filter to obtain an emulsion of resin fine particles 1. Based on this, the acid value was adjusted by changing the monomer species and ratio such that the acid values of the resin fine particles were the resin acid values described in Tables 1 to 3.

Resin fine particles 2 and 3 were separately prepared in the same manner as in Example 1 except that the acid values were adjusted by changing the monomer species and ratio such that the acid values were the resin acid values shown in Tables 1 to 3.

Surfactants

Surfactant 1: Polyoxyethylene stearyl ether HLB 13.9 (trade name "EMULGEN 320P", manufactured by Kao Corporation, ethers of polyalkylene oxide)

Surfactant 2: Polyoxyethylene alkyl ether (number of carbon atoms of alkyl: 12 to 13) (trade name "Newcol 2310", manufactured by Nippon Nyukazai Co., Ltd., ethers of polyalkylene oxide)

Surfactant 3: Polyoxyethylene sorbitan oleate (Newcol 85, manufactured by Nippon Nyukazai Co., Ltd., esters of higher fatty acid)

Surfactant 4: Acetylene diol-based surfactant (trade name "Dynol 607", manufactured by Air Products and Chemicals, Inc.)

Surfactant 5: Silicone-based surfactant (trade name "BYK 348", manufactured by BYK Additives & Instruments)

Surfactant 6: Silicone-based surfactant (trade name "BYK 333", manufactured by BYK Additives & Instruments)

Surfactant 7: Fluorine-based surfactant (trade name "Surflon S-211", manufactured by AGC Seimi Chemical Co., Ltd.)

Surfactant 8: Polyoxyethylene lauryl ether phosphate ester surfactant (trade name "Plysurf A219B", manufactured by DKS Co., Ltd.)

3.2. Evaluation of Ink

The amount of oxidation of the resin fine particles and the dispersant resin was measured, and each acid value of each ink was calculated. Furthermore, an ink storability test was conducted. The results are described in Tables 1 to 3.

Measurement of Resin Oxidation

The acid value of the resin was measured using a potentiometric automatic titration apparatus AT 610 (manufactured by Kyoto Electronics Manufacturing Co., Ltd.).

Ink Storability Test

The ink composition was placed in a glass bottle so as to be 80% full, held in a constant temperature environment at 70° C. for 3 days, and the viscosity and particle size change before and after storage were observed and evaluated according to the following criteria. Here, the change in viscosity was evaluated by measuring the viscosity of the ink at room temperature using a viscometer (product name "MCR-300" manufactured by Physica) and calculating the change in viscosity according to the following expression.

[(Viscosity After Storage−Initial Viscosity)/(Initial Viscosity)]×100(%)

The particle size change was evaluated by measuring the volume average diameter (MV) in the particle size distribution in the ink before and after storage and calculating the change in viscosity using the following expression.

[(MV after storage−initial MV)/(initial MV)]×100 (%)

For the measurement of the volume average diameter in the particle size distribution, a particle size distribution meter (model "Nanotrac UPA-EX 150" manufactured by Nikkiso Co., Ltd.) using the dynamic light scattering method as a measurement principle was used.

Evaluation Criteria

A: viscosity change≤20%, change in particle size≤30%

B: viscosity change≤20%, 30%<change in particle size≤50%

C: viscosity change>20%, change in particle size>50%

3.3. Preparation of Reaction Liquid

Reaction liquids 1 to 3 were prepared by mixing and stirring each component according to the composition shown in Table 4 and carrying out filtration through a 10 μm membrane filter. Here, all the numerical values in Table 4 indicate % by mass, and pure water was added thereto such that the total mass of the reaction liquid was 100% by mass.

TABLE 4

|  | Reaction Liquid 1 | Reaction Liquid 2 | Reaction Liquid 3 |
| --- | --- | --- | --- |
| Calcium acetate | 1.5 |  |  |
| Acetic acid |  | 4 |  |
| Catiomaster |  |  | 2.5 |
| 1,2-pentanediol | 30 | 30 | 30 |

TABLE 4-continued

|  | Reaction Liquid 1 | Reaction Liquid 2 | Reaction Liquid 3 |
|---|---|---|---|
| 2-pyrrolidone | 10 | 10 | 10 |
| Dynol 607 | 0.5 | 0.5 | 0.5 |
| Water | Remainder | Remainder | Remainder |
| Total | 100 | 100 | 100 |

The details of the substances described by the trade names in Table 4 are as follows.

Dynol 607 (trade name, manufactured by Air Products and Chemicals, Inc., acetylene diol-based surfactant) Catiomaster (registered trademark) PD (trade name, manufactured by Yokkaichi Chemical Company, Ltd., amine epichlorohydrin condensation-type polymer aqueous solution, cationic resin)

Calcium acetate (polyvalent metal salt). Calcium acetate monohydrate was used, but this is calcium acetate solid content in the table.

Acetic Acid (Organic Acid)

3.4. Evaluation Test of Ink Jet Recording Method

For each ink described in Tables 1 to 3, an evaluation test of an ink jet recording method was conducted.

3.4.1. Recording Test

Printing evaluation was carried out using a modified ink jet printer machine (trade name "SC-S 50650", manufactured by Seiko Epson Corporation). First, the ink and the reaction liquid were filled in the head, and the reaction liquid was ink jet coated at a resolution of 720×720 dpi and an attachment amount of 1.0 mg/inch$^2$. Next, the ink filled in the head was ink jet coated on the reaction liquid attachment surface with a resolution of 720×720 dpi and an attachment amount of 10.0 mg/inch$^2$. During ink jet coating, the platen heater was operated to adjust the surface temperature of the recording medium to the primary heating temperature shown in Tables 1 to 3. After recording, the recording medium was discharged from the printer and dried at 80° C. for 5 minutes. Here, the ink jet printer has a suction cleaning mechanism for sucking and discharging ink from the nozzles.

The following recording medium was used as the recording medium.

Recording Medium

Recording medium 1: Acrylic film (trade name "AF1020", manufactured by 3M Japan Ltd.)

Recording medium 2: Polyvinyl chloride (trade name "IJ180-10", manufactured by 3M Japan Ltd.)

3.4.2. Evaluation of Ejection Stability

Recording was performed continuously for 2 hours under the recording conditions of the recording test 3.4.1. After the recording, it was determined how many nozzles did not eject out of 360 nozzles and evaluation was carried out according to the following criteria. During the recording, the suction cleaning operation was not performed.

Evaluation Criteria

A: the number of non-ejecting nozzles (nozzle missing) is 0
B: the number of non-ejecting nozzles is 1 to 10
C: the number of non-ejecting nozzles is 11 or more 3.4.3. Evaluation of Clogging Recoverability After recording under the recording conditions of the recording test 3.4.1., the nozzle surface was wiped lightly once with a non-woven fabric wetted with water to create a state in which missing nozzles occurred and left in an environment of 30° C. and 30% RH. Thereafter, a suction cleaning operation was performed to evaluate the number of times for recovering the ejection, and the evaluation was carried out according to the following criteria.

Evaluation Criteria

A: More than 95% of nozzles recovered after one cleaning
B: More than 95% of nozzles recovered after three cleanings
C: Less than 95% of nozzles recovered after three cleanings 3.4.4. Evaluation of Abrasion Resistance A solid pattern of 20×80 mm was prepared under the printing conditions of the recording test 3.4.1. and the abrasion resistance was evaluated using an AB-301 Color Fastness Rubbing Tester (trade name, manufactured by Tester Sangyo Co., Ltd.). Specifically, the surface of the recording medium on which the image was recorded was rubbed for 30 reciprocations with a rubbing element with an attached white cotton cloth (conforming to JIS L 0803) under a load of 300 g. The degree of peeling of the image (coating film) on the surface of the recording medium was visually observed and evaluated according to the following criteria.

Evaluation Criteria

A: Bleeding on the printed surface, no peeling
B: Peeled area of printed surface was less than 5%
C: Peeled area of printed surface was 5% or more and less than 10%
D: Peeled area of printed surface was 10% or more 3.4.5. Evaluation of Image Quality A solid pattern of 30×30 mm was prepared under the conditions of the recording test 3.4.1., and the presence or absence of printing unevenness was visually checked and evaluated according to the following criteria.

Evaluation Criteria

A: A state (unevenness) in which the ink density was not uniform in the solid pattern was not observed
B: Slight unevenness was observed in the solid pattern
C: Large unevenness was observed in the solid pattern
D: White-out spots were observed in the solid pattern 3.4.6. Evaluation of Blocking Resistance (Adhesion Resistance)

The blocking resistance is a property by which the ink coating film of the recorded matter is easily stuck in a high temperature and high humidity environment. Regarding the recorded matter obtained under the conditions of the recording test 3.4.1., the recording surface was superimposed on the rear surface of another recording medium of the same type, a load of 300 g/cm$^2$ was applied thereto, the superimposed recording surface was held in an environment of 35° C. and a humidity of 50% RH for 24 hours, then the peeled state of the printed part was confirmed and evaluated according to the following criteria.

Evaluation Criteria

A: No peeling of printed part
B: Less than 5% peeling of printed part
C: 5% or more and less than 10% peeling of printed part
D: 10% or more peeling of printed part 3.5. Evaluation Results The results of the evaluation test of the ink composition and the ink jet recording method are shown in Tables 1 to 3.

In the evaluation of the ink compositions shown in Tables 1 to 3, it was possible to secure the storage stability of the ink in all of the Examples in which the total acid value of the ink was 200 (mg KOH/100 g ink) or less and which included a non-ionic surfactant and a resin dissolving solvent. In contrast, Comparative Examples 3 and did not contain a non-ionic surfactant and had poor storage stability.

In the evaluation of the ink jet recording method shown in Tables 1 to 3, in all of the Examples in which the total acid value of the ink was 200 (mg KOH/100 g ink) or less and which included a non-ionic surfactant and a resin dissolving solvent, the ejection stability and adhesion resistance were excellent and the abrasion resistance was also superior. On the other hand, in the Comparative Examples, either the ejection stability or the adhesion resistance was inferior.

In detail, from Examples 1 and 2 and Comparative Examples 1, 2, 4, and 8, the results were that the ejection stability and the clogging recoverability were excellent due to the total acid value of the ink being 200 (mg KOH/100 g ink) or less and a non-ionic surfactant being contained.

From Examples 1 and 2, the results were that the lower the total acid value of the ink, the better the ejection stability and clogging recoverability tended to be, and at the same time the adhesion resistance was also good.

From Examples 2 and 4 to 9, ethers of polyalkylene oxide and esters of higher fatty acid as a non-ionic surfactant were particularly excellent in ejection stability and clogging recoverability. On the other hand, non-ionic surfactants other than the above tended to particularly improve image quality. From Example 10, when two kinds of surfactants were used in combination, the result was that the image quality was improved in addition to the ejection stability and the clogging recoverability.

From the comparison between Examples 11 and 12 and Example 2, the solubility of the resin varied depending on the kind of the resin dissolving solvent, thus, although there were differences in the ejection stability and clogging recoverability, it was found that the inks were inks having practical value due to the total acid value of the ink being 200 (mg KOH/100 g ink) or less and a non-ionic surfactant being contained therein.

From the comparison between Example 1 and Example 13, the result was that, when the ink includes glycerin, although the ejection stability and clogging recoverability are improved, the drying property is deteriorated and the abrasion resistance and adhesion resistance were deteriorated.

From the comparison between Example 2 and Example 14, it was possible to obtain the same effects even in a case where different pigments were used and, from the comparison between Example 2 and Example 15, it was possible to obtain the same effects even in cases where different dispersants were used.

From the comparison between Example 2 and Example 17, the use of the reaction liquid tended to improve the image quality while reducing the adhesion resistance. From this, it was found that the embodiment of the invention is particularly useful in that it is possible to obtain excellent adhesion resistance even in a case where the image quality is improved by using a reaction liquid.

From the comparison between Example 1 and Examples 16, 19, and 20, the adhesion resistance was improved when an acrylic film was used as a recording medium rather than polyvinyl chloride. This is because, since the release paper of the polyvinyl chloride was paper, the adhesion property was improved with respect to when the release paper of the acrylic film was a PET film.

Excellent effects were obtained even in cases where different reaction liquids were used in Examples 16, 19, and 20.

From the comparison between Example 2 and Example 18, when the primary heating temperature became higher, the image quality improved as the drying during printing progressed, while on the other hand, when drying in the vicinity of the nozzle surface was suppressed by the primary heating temperature being low, the ejection stability improved. From this, it was found that the embodiment of the invention is particularly useful in that it is possible to obtain excellent ejection stability even in a case of performing primary heating and improving the image quality.

In Comparative Examples 6 and 7, compared with Example 2, since a resin dissolving solvent was not included, even in a case where moisture evaporated in the vicinity of the nozzle surface, dissolution of the resin did not easily occur, thus the ejection stability and clogging recoverability were excellent, but the permeability to the recording medium and the drying property were deteriorated, resulting in inferior blocking resistance, image quality, and abrasion resistance. In Comparative Example 7, although the ink did not include an anionic surfactant and the acid value of the ink exceeded 200 (mg KOH/100 g ink) in the same manner as Comparative Example 3, the ejection stability was not bad and the ink storage stability was also not bad. From this, it was found that when the ink included a resin dissolving solvent, the ejection stability and the storage stability were deteriorated.

In Comparative Examples 1 to 3 and 8, the total acid value of the ink exceeded 200 (mg KOH/100 g ink), and the ejection stability was inferior.

In Comparative Examples 3 and 5, the ink did not include a non-ionic surfactant and the ink storage stability was inferior. In addition, the ejection stability was also inferior. In Comparative Example 4, the ink included an anionic surfactant and the ink storage stability was improved, but the ejection stability was not improved.

As described above, the aqueous ink jet ink composition was an aqueous ink jet ink composition including resin fine particles, a non-ionic surfactant, a resin dissolving solvent, and water, in which, in the aqueous ink jet ink composition, in a case where the total acid value was 200 (mg KOH/100 g ink) or less, the ink was excellent in storage stability and, in ink jet recording using this ink, it was possible to secure blocking resistance (adhesion resistance), ejection stability, and abrasion resistance.

The invention is not limited to the above-described embodiment, and various modifications are possible. For example, the invention includes configurations substantially the same as the configurations described in the embodiments (for example, configurations having the same function, method, and result, or configurations having the same object and effect). In addition, the invention includes configurations in which non-essential parts of the configurations described in the embodiments are replaced. In addition, the invention includes configurations which achieve the same operation and effect as the configurations described in the embodiments, or configurations able to achieve the same object. In addition, the invention includes configurations in which a publicly-known technique is added to the configurations described in the embodiments.

The entire disclosure of Japanese Patent Application No. 2017-063128, filed Mar. 28, 2017 is expressly incorporated by reference herein.

What is claimed is:
1. An aqueous ink jet ink composition comprising:
resin fine particles;
a dispersant resin;
a non-ionic surfactant;
a resin dissolving solvent selected from the group consisting of a cyclic amide, an alkoxyamide, a cyclic esters, and an ester; and
water,
wherein a content of the resin dissolving solvent is 4 to 18% by mass with respect to the total mass of the aqueous ink jet ink composition, wherein, in the aqueous ink jet ink composition, a total acid value of an acid value of the resin fine particles (mg KOH/100 g ink) and an acid value of a dispersant resin (mg KOH/100 g ink) is in the range of 84 to 200 (mg KOH/100 g ink), and
the dispersant resin has an acid value in a range of 50 to 300 (mg KOH/g).

2. The aqueous ink jet ink composition according to claim 1,
wherein at least one selected from the group consisting of ethers of polyalkylene oxide, esters of higher fatty acid, silicone-based compounds, acetylene glycol-based compounds, and fluorine-based compounds is used as the non-ionic surfactant.

3. The aqueous ink jet ink composition according to claim 1,
wherein an acid value of the resin fine particles in the aqueous ink jet ink composition is 170 (mg KOH/100 g ink) or less.

4. The aqueous ink jet ink composition according to claim 1,
wherein an acid value of the dispersant resin in the aqueous ink jet ink composition is 100 (mg KOH/100 g ink) or less.

5. The aqueous ink jet ink composition according to claim 1,
wherein the dispersant resin has an acid value in a range of 100 to 300 (mg KOH/g).

6. The aqueous ink jet ink composition according to claim 1,
wherein resin fine particles formed of a resin with an acid value of 60 (mg KOH/g) or less are included as the resin fine particles.

7. The aqueous ink jet ink composition according to claim 1,
wherein any one kind or more selected from the group consisting of a (meth)acrylic resin, a polyurethane-based resin, and a polyester-based resin are included as the resin of the resin fine particles.

8. The aqueous ink jet ink composition according to claim 1,
wherein a content of the resin fine particles is 2% by mass or more and 20% by mass or less.

9. The aqueous ink jet ink composition according to claim 1,
wherein a content of an organic solvent having a standard boiling point of higher than 280° C. is 3% by mass or less.

10. The aqueous ink jet ink composition according to claim 1, wherein the content of the resin dissolving solvent is 8 to 18% by mass with respect to the total mass of the aqueous ink jet ink composition.

11. The aqueous ink jet ink composition according to claim 1, wherein the total acid value of the acid value of the resin fine particles (mg KOH/100 g ink) and the acid value of the dispersant resin (mg KOH/100 g ink) when the aqueous ink jet ink composition includes the dispersant resin is 114 to 200 (mg KOH/100 g ink).

12. The aqueous ink jet ink composition according to claim 1, further comprising a pigment, wherein the pigment is dispersed by the dispersant resin.

13. The aqueous ink jet ink composition according to claim 1, wherein the acid value of the dispersant resin in the aqueous ink jet ink composition is 20 to 100 (mg KOH/100 g ink).

14. The aqueous ink jet ink composition according to claim 1,
wherein the acid value of the dispersant resin is 50 to 200 (mg KOH/g).

15. An ink jet recording method comprising:
attaching an aqueous ink jet ink composition to a recording medium by ejecting from an ink jet head, the aqueous ink jet ink composition including:
resin fine particles;
a non-ionic surfactant;
a resin dissolving solvent selected from the group consisting of a cyclic amide, an alkoxyamide, a cyclic esters, and an ester, a content of the resin dissolving solvent being 1% by mass or more with respect to a total mass of the aqueous ink jet ink composition; and
water,
wherein the attaching of the aqueous ink jet ink composition is performed on a heated recording medium,
a surface temperature of the recording medium in the attaching of the aqueous ink jet ink composition is 38 degrees C. or less, and
in the aqueous ink jet ink composition, a total acid value of an acid value of the resin fine particles (mg KOH/100 g ink) and an acid value of a dispersant resin (mg KOH/100 g ink) when the aqueous ink jet ink composition includes a dispersant resin is 200 (mg KOH/100 g ink) or less.

16. The ink jet recording method according to claim 15, further comprising:
attaching a reaction liquid to a recording medium.

17. The ink jet recording method according to claim 15,
wherein the recording medium is a recording medium with a low absorbing property or a recording medium with a non-absorbing property.

18. The ink jet recording method according to claim 15,
wherein the ink jet recording method is performed using an ink jet recording apparatus provided with an ink jet head and a mechanism for discharging ink from the ink jet head and which is a mechanism other than a pressure generating unit for recording by ejecting an ink composition provided in the ink jet head, and
control is performed in which recording is performed for one hour or longer without performing cleaning performed by the mechanism.

19. The ink jet recording method according to claim 15,
wherein the surface temperature of the recording medium in the attaching of the aqueous ink jet ink composition is 30 to 38 degrees C.

20. The ink jet recording method according to claim 15, the dispersant resin has an acid value in a range of 50 to 300 (mg KOH/g).

21. The ink jet recording method according to claim 15,
wherein at least one selected from the group consisting of ethers of polyalkylene oxide, esters of higher fatty acid, silicone-based compounds, acetylene glycol-based compounds, and fluorine-based compounds is used as the non-ionic surfactant.

22. The ink jet recording method according to claim 15,
wherein an acid value of the resin fine particles in the aqueous ink jet ink composition is 170 (mg KOH/100 g ink) or less.

23. The ink jet recording method according to claim 15,
wherein an acid value of the dispersant resin in the aqueous ink jet ink composition is 100 (mg KOH/100 g ink) or less.

24. The ink jet recording method according to claim 15,
wherein the dispersant resin has an acid value in a range of 100 to 300 (mg KOH/g).

25. The ink jet recording method according to claim 15, wherein resin fine particles formed of a resin with an acid value of 60 (mg KOH/g) or less are included as the resin fine particles.

26. The ink jet recording method according to claim 15, wherein any one kind or more selected from the group consisting of a (meth)acrylic resin, a polyurethane-based resin, and a polyester-based resin are included as the resin of the resin fine particles.

27. The ink jet recording method according to claim 15, wherein a content of the resin fine particles is 2% by mass or more and 20% by mass or less.

28. The ink jet recording method according to claim 15, wherein a content of an organic solvent having a standard boiling point of higher than 280° C. is 3% by mass or less.

29. The ink jet recording method according to claim 15, wherein the content of the resin dissolving solvent is 8 to 18% by mass with respect to the total mass of the aqueous ink jet ink composition.

30. The ink jet recording method according to claim 15, wherein the total acid value of the acid value of the resin fine particles (mg KOH/100 g ink) and the acid value of the dispersant resin (mg KOH/100 g ink) when the aqueous ink jet ink composition includes the dispersant resin is 114 to 200 (mg KOH/100 g ink).

31. The ink jet recording method according to claim 15, further comprising a pigment, wherein the pigment is dispersed by the dispersant resin.

32. The ink jet recording method according to claim 15, wherein the acid value of the dispersant resin in the aqueous ink jet ink composition is 20 to 100 (mg KOH/100 g ink).

33. The ink jet recording method according to claim 15, wherein the acid value of the dispersant resin is 50 to 200 (mg KOH/g).

* * * * *